United States Patent
Yamada et al.

(10) Patent No.: US 8,525,431 B2
(45) Date of Patent: Sep. 3, 2013

(54) MODULATED POWER LIGHTING MODE FOR LIGHTING APPARATUS OF HIGH-PRESSURE DISCHARGE LAMP AND PROJECTOR

(75) Inventors: Koji Yamada, Hyogo (JP); Takanori Samejima, Hyogo (JP); Takashi Yamashita, Hyogo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 332 days.

(21) Appl. No.: 12/926,616

(22) Filed: Nov. 30, 2010

(65) Prior Publication Data
US 2011/0128508 A1    Jun. 2, 2011

(30) Foreign Application Priority Data

Dec. 1, 2009 (JP) ................................. 2009-273438
Apr. 5, 2010 (JP) ................................. 2010-086699

(51) Int. Cl.
*H05B 41/16* (2006.01)
*G03B 21/20* (2006.01)

(52) U.S. Cl.
USPC .......................................... 315/287; 353/85

(58) Field of Classification Search
USPC .................... 353/85; 315/246–287
See application file for complete search history.

(56) References Cited

U.S. PATENT DOCUMENTS

| | | | |
|---|---|---|---|
| 6,429,603 B1 * | 8/2002 | Tsugita et al. ................. | 315/224 |
| 6,979,960 B2 | 12/2005 | Okawa et al. | |
| 7,170,237 B2 * | 1/2007 | Suzuki et al. ................. | 315/246 |
| 7,622,869 B2 * | 11/2009 | Watanabe et al. ............. | 315/291 |
| 8,008,868 B2 | 8/2011 | Yamauchi | |
| 8,067,903 B2 | 11/2011 | Deppe et al. | |
| 2009/0051300 A1 * | 2/2009 | Deppe et al. ................. | 315/307 |
| 2009/0237623 A1 * | 9/2009 | Yamauchi ....................... | 353/85 |
| 2011/0025989 A1 | 2/2011 | Ono et al. | |

FOREIGN PATENT DOCUMENTS

| | | |
|---|---|---|
| JP | 02-148561 A | 6/1990 |
| JP | 2000-131668 A | 5/2000 |
| JP | 2004-207018 A | 7/2004 |
| JP | 2005-038815 A | 2/2005 |
| JP | 2005-276623 A | 10/2005 |
| JP | 2006-332015 A | 12/2006 |
| JP | 2009-527871 A | 7/2009 |
| JP | 2009-252352 A | 10/2009 |
| JP | 2009-259795 A | 11/2009 |

OTHER PUBLICATIONS

Japanese Office Action issued for corresponding Japanese Application No. 2010-086699.

* cited by examiner

*Primary Examiner* — Thanh Luu
*Assistant Examiner* — Renee Naphas
(74) *Attorney, Agent, or Firm* — Rader, Fishman & Grauer PLLC

(57) ABSTRACT

A lighting apparatus for a high-pressure discharge lamp that has an electric discharge container made of quartz glass, and containing a pair of counter electrodes and a power supply unit that supplies AC current to the high-pressure discharge lamp. The power supply unit has a stationary power lighting mode and a modulated power lighting mode that supplies current having power less than power in the stationary power lighting mode. The modulated power lighting mode supplies a rectangular AC current having a first term and a second term. A mean high-frequency current value supplied to a first electrode is greater than a mean current value supplied to a second electrode in the first term. A current is supplied to the second electrode for a term longer than the half-cycle period in the second term, the current being lower than the mean high-frequency current value supplied to the first electrode.

21 Claims, 22 Drawing Sheets

FIG. 8

Table: Result of Experiment

| Unit | (a) f1 Hz | (b) Number of waves n | (c) Number of waves | (d) I1a A | (d) I1b A | (e) I1a/I1b*10(12 =I1b) % | (f) (=I1b) A | (g) T1+T2 ms | (h) ΔSa/ΔSb | (i) |
|---|---|---|---|---|---|---|---|---|---|---|
| Lamp 1 | 740 | 19 | 1 | 2.25 | 0.75 | 300% | 0.75 | 13.5 | 21.00 | × |
| Lamp 2 | 740 | 21 | 2 | 2.30 | 0.77 | 300% | 0.77 | 15.5 | 11.50 | × |
| Lamp 3 | 740 | 19 | 2 | 2.30 | 0.77 | 300% | 0.77 | 14.2 | 10.50 | ○ |
| Lamp 4 | 740 | 17 | 3 | 2.37 | 0.79 | 300% | 0.79 | 13.5 | 6.33 | ○ |
| Lamp 5 | 740 | 15 | 5 | 2.50 | 0.83 | 300% | 0.83 | 13.5 | 3.40 | ○ |
| Lamp 6 | 740 | 7 | 10 | 3.06 | 1.02 | 300% | 1.02 | 11.5 | 0.90 | ◎ |
| Lamp 7 | 740 | 5 | 12 | 3.33 | 1.11 | 300% | 1.11 | 11.5 | 0.58 | ○ |
| Lamp 8 | 740 | 3 | 15 | 3.68 | 1.23 | 300% | 1.23 | 12.2 | 0.33 | ○ |
| Lamp 9 | 740 | 1 | 15 | 4.00 | 1.33 | 300% | 1.33 | 10.8 | 0.20 | × |
| Lamp 10 | 925 | 7 | 14 | 2.76 | 0.92 | 300% | 0.92 | 11.4 | 0.64 | ◎ |
| Lamp 11 | 925 | 9 | 12 | 2.52 | 0.84 | 300% | 0.84 | 11.4 | 0.92 | ○ |
| Lamp 12 | 925 | 7 | 14 | 2.70 | 1.08 | 250% | 1.08 | 11.4 | 0.50 | ○ |
| Lamp 13 | 925 | 9 | 12 | 2.55 | 1.02 | 250% | 1.02 | 11.4 | 0.71 | ○ |
| Lamp 14 | 925 | 7 | 14 | 2.32 | 1.16 | 200% | 1.16 | 11.4 | 0.36 | ○ |
| Lamp 15 | 925 | 9 | 12 | 2.24 | 1.12 | 200% | 1.12 | 11.4 | 0.50 | ○ |
| Lamp 16 | 740 | 18 | 2 | 2.13 | 0.71 | 300% | 0.71 | 13.5 | 10.00 | ○ |
| Lamp 17 | 740 | 17 | 3 | 2.19 | 0.73 | 300% | 0.73 | 13.5 | 6.33 | ◎ |
| Lamp 18 | 740 | 15 | 4 | 2.25 | 0.75 | 300% | 0.75 | 12.8 | 4.25 | ◎ |
| Lamp 19 | 740 | 15 | 5 | 2.31 | 0.77 | 300% | 0.77 | 13.5 | 3.40 | ○ |
| Lamp 20 | 740 | 7 | 10 | 2.82 | 0.94 | 300% | 0.94 | 11.5 | 0.90 | ◎ |
| Lamp 21 | 740 | 5 | 12 | 3.06 | 1.02 | 300% | 1.02 | 11.5 | 0.58 | ◎ |
| Lamp 22 | 740 | 3 | 15 | 3.39 | 1.13 | 300% | 1.13 | 12.2 | 0.33 | ○ |
| Lamp 23 | 740 | 17 | 3 | 2.38 | 0.95 | 250% | 0.95 | 13.5 | 4.83 | ○ |
| Lamp 24 | 740 | 15 | 4 | 2.43 | 0.97 | 250% | 0.97 | 12.8 | 3.25 | ◎ |
| Lamp 25 | 740 | 15 | 5 | 2.48 | 0.99 | 250% | 0.99 | 13.5 | 2.60 | ○ |
| Lamp 26 | 740 | 7 | 10 | 2.80 | 1.12 | 250% | 1.12 | 11.5 | 0.70 | ○ |
| Lamp 27 | 740 | 5 | 12 | 2.95 | 1.18 | 250% | 1.18 | 12.2 | 0.46 | ◎ |
| Lamp 28 | 740 | 3 | 15 | 3.13 | 1.25 | 250% | 1.25 | 13.5 | 0.27 | ○ |
| Lamp 29 | 740 | 17 | 3 | 1.84 | 0.92 | 200% | 0.92 | 13.5 | 3.33 | ◎ |
| Lamp 30 | 740 | 7 | 10 | 1.84 | 0.92 | 200% | 0.92 | 11.5 | 0.50 | ○ |
| Lamp 31 | 480 | 3 | 8 | 3.06 | 1.02 | 300% | 1.02 | 11.5 | 0.63 | ◎ |
| Lamp 32 | 740 | 5 | 6 | 2.70 | 0.90 | 300% | 0.90 | 7.4 | 1.17 | ○ |
| Lamp 33 | 740 | 3 | 8 | 3.00 | 1.20 | 250% | 1.20 | 7.4 | 0.50 | ◎ |
| Lamp 34 | 740 | 5 | 6 | 2.75 | 1.10 | 250% | 1.10 | 7.4 | 0.92 | ◎ |

(a) Rated frequency; (b) The number of rectangular waves in a half cycle period (τ) of high-frequency current flowing in a first term (τ1); (c) The number of rectangular waves in a half cycle period (τ) of high-frequency current of the first term (τ1) flowing in a second term (τ2); (d) and (e) Current value in the first waveform term; (f) Current disproportionate ratio; (g) Current value in the second waveform term τk (i) ΔSa/ΔSb (j)

FIG. 12
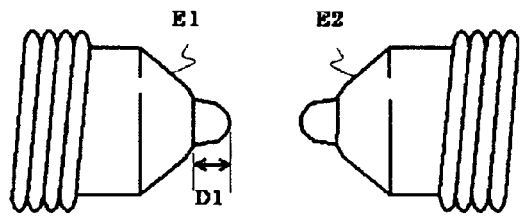
FIG.12A
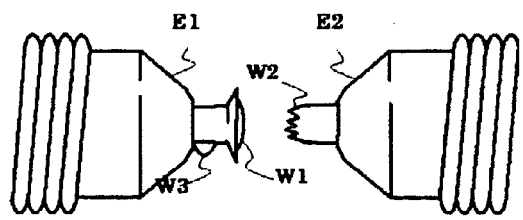
FIG.12B
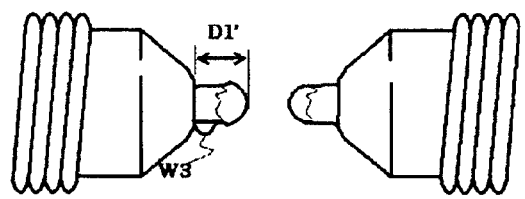
FIG.12C
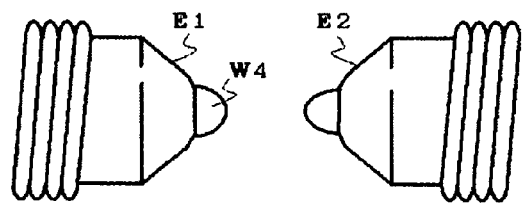
FIG.12D
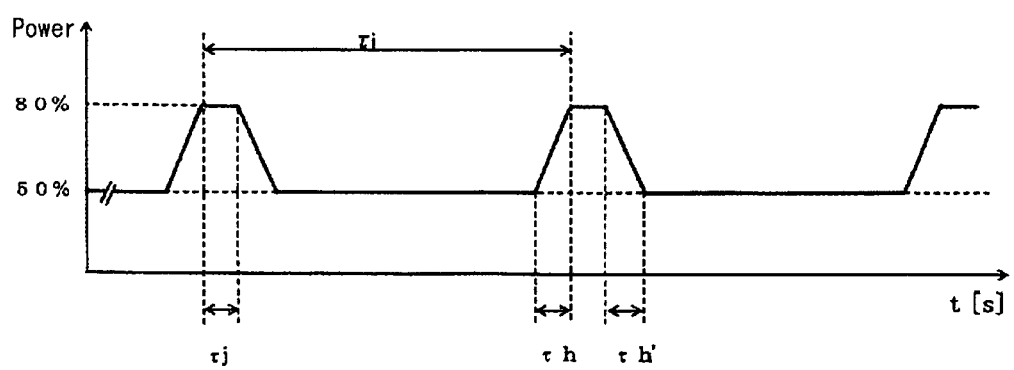
FIG. 13

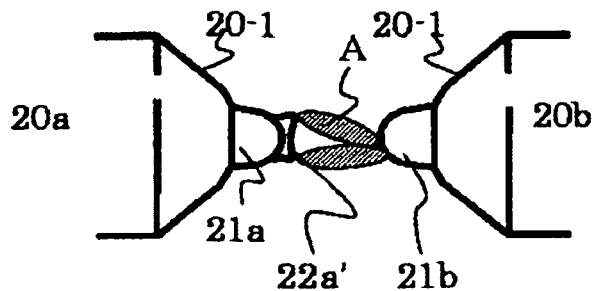
FIG.18A
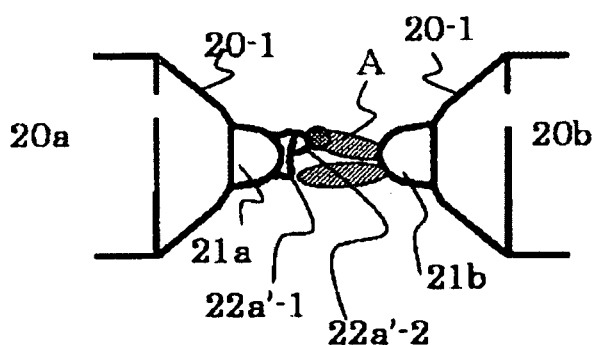
FIG.18B
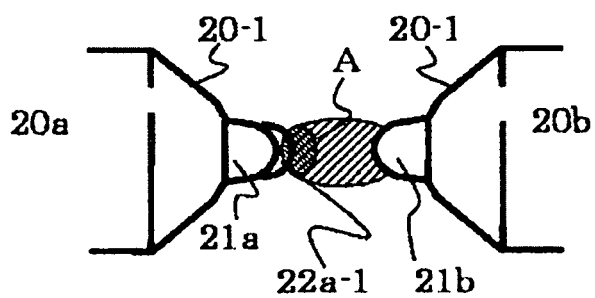
FIG.18C
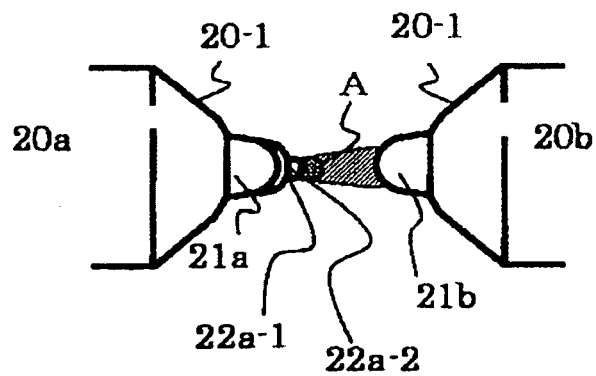
FIG.18D
FIG. 18

FIG. 24
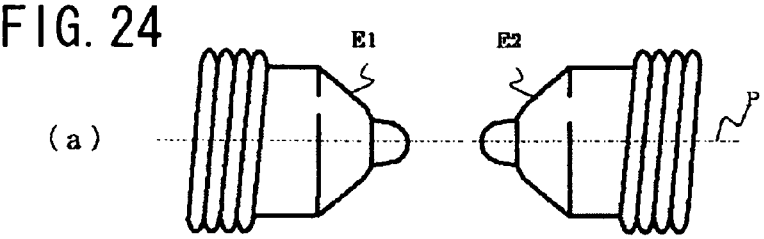
(a) FIG.24A
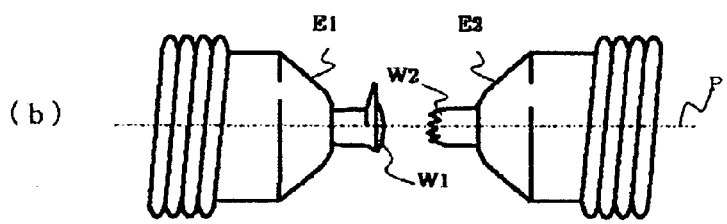
(b) FIG.24B
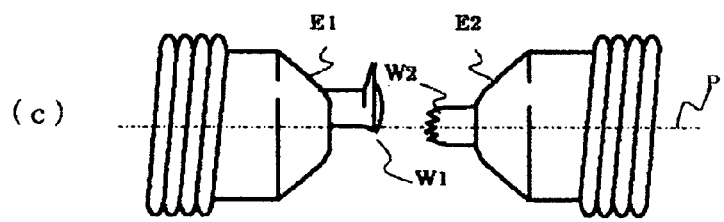
(c) FIG.24C
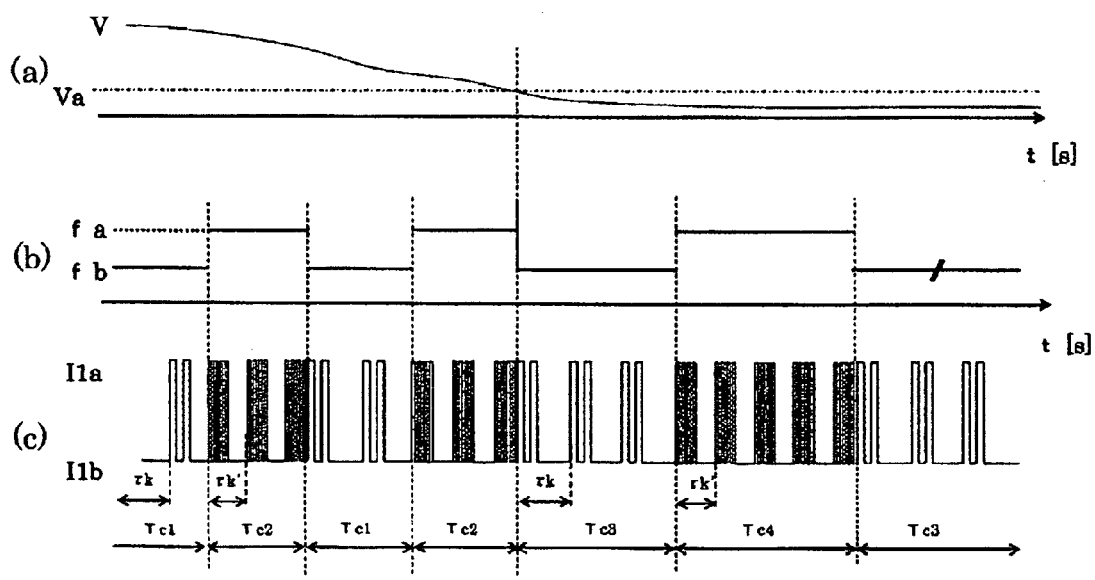
FIG. 25

FIG. 28
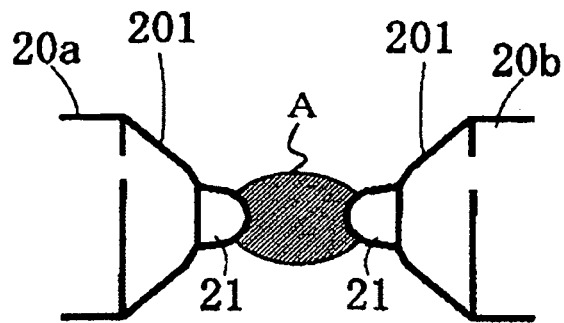
FIG.28A
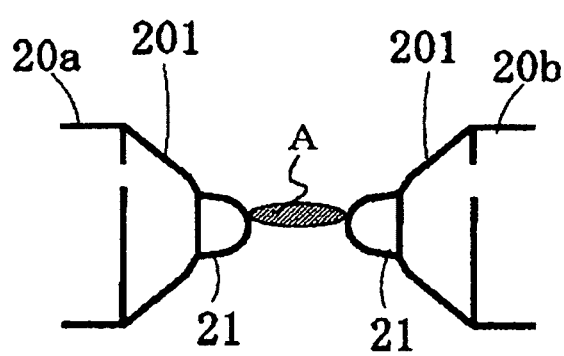
FIG.28B
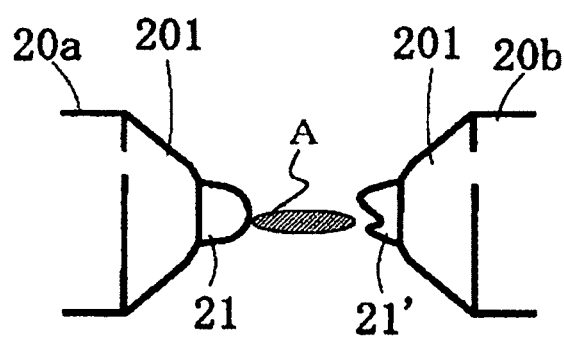
FIG.28C
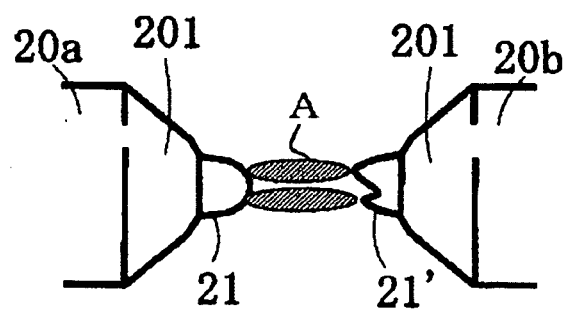
FIG.28D FIG. 29
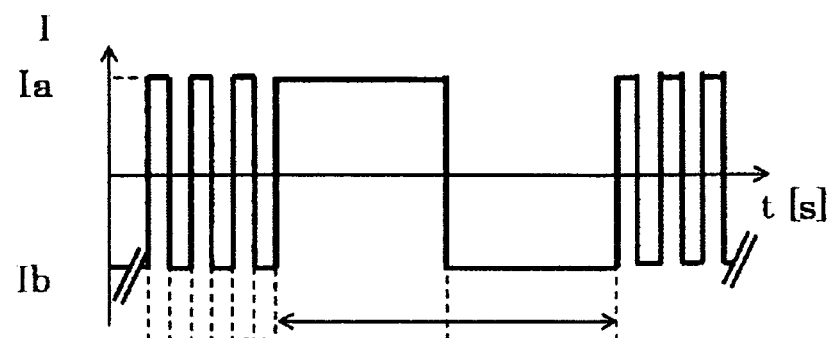
(a)
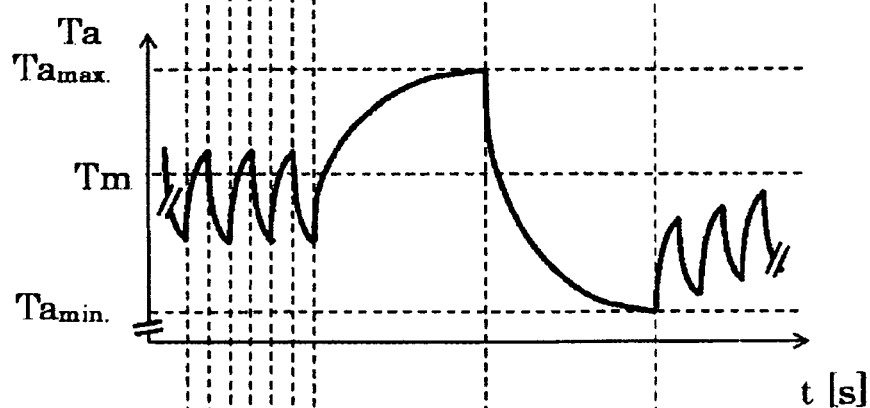
(b)
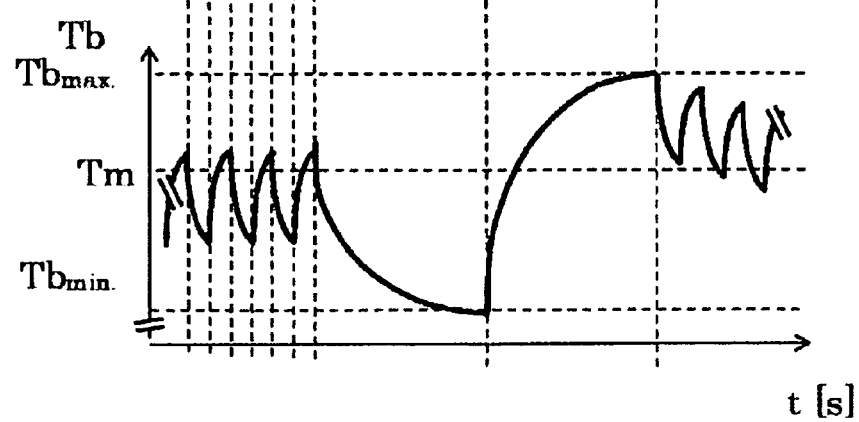
(c)

MODULATED POWER LIGHTING MODE FOR LIGHTING APPARATUS OF HIGH-PRESSURE DISCHARGE LAMP AND PROJECTOR

CROSS-REFERENCES TO RELATED APPLICATION

This application claims priority from Japanese Patent Application Serial No. 2009-273438 filed Dec. 1, 2009 and Japanese Patent Application Serial No. 2010-086699 filed Apr. 5, 2010, the contents of which are incorporated herein by reference in their entirety.

TECHNICAL FIELD

The present invention relates to a lighting apparatus for a high-pressure discharge lamp and a projector including the lighting apparatus for a high-pressure discharge lamp. In particular, the present invention relates to a lighting apparatus for a high-pressure discharge lamp that includes an AC-driven high-pressure discharge lamp that has a mercury-containing arc tube, which at the start of lighting has a high mercury vapor pressure, and a power supply unit supplying electric power to the lamp; and to a projector including the lighting apparatus for a high-pressure discharge lamp.

BACKGROUND

Projective projectors, such as liquid crystal projectors and Digital Light Processing (trademark, DLP) projectors, which can display images on large-area screens, are effective for reproduction of real and powerful images. FIG. 7 shows a configuration of such a projector. The projector includes a lighting apparatus for a high-pressure discharge lamp provided with a high-pressure discharge lamp 10 having a reflective mirror and a power supply unit 30 supplying electric power to the lamp 10; a projector control unit 31; a light modulation device 32 composed of, for example, a liquid crystal panel; and a magnifying device 33 including a projection lens that projects enlarged images appearing in the light modulation device 34. Enlarged images expanded by the magnifying device 33 are projected onto a screen 32. The projector control unit 31 includes an image controller 31a that processes image signals received from an external unit 35 such as a personal computer or a television set and a lighting controller 31b that orders the power supply unit 30 to send a turning-on command and a turning power command for switching on the high-pressure discharge lamp.

In recent years, projectors have been further compacted, further simplified. and have been used in standard homes, in addition to commercial use. Such a trend requires a higher screen brightness so that the projectors can display any image in lighted environments and the type of images that and persuades projectors to have "light modulation functions" (for example, Japanese Patent Application Publication No. 2000-131668). The light modulation function involves lighting of the high-pressure discharge lamp at a low electric power that is much lower than its rated lighting power to control the brightness of the lamp and to reduce the power consumption. The electric power supplied by the light modulation function is about 25 to 80% of the rated power of the high-pressure discharge lamp.

Such a projector is generally provided with two operation modes, that is, "rated power lighting" and "economic power lighting," involves an operation at a power that is about 80% of the rated power lighting. Since the "rated power lighting" and "economic power lighting" generally have very similar lighting waveforms, lighting of the lamp by the "rated power lighting" and "economic power lighting" is collectively referred to as "stationary power lighting" hereinafter, and its lighting mode is referred to as a "stationary power lighting mode." Throughout the specification, the operation of the lamp using the light modulation function described above is referred to as "modulated power lighting" and its lighting mode is referred to as a "modulated lighting mode."

It is preferred that the power of the lamp be reduced to the minimum in a modulated power lighting mode using such a light modulation function due to the following reasons: Lighting at low electric power reduces heat dissipation from the lamp. This can abolish or diminish the rotation of a cooling fan projector, which is the main cause of noise generation. The low-power lighting can also reduce thermal load to the lamp and thus can prolong the service life of the lamp. The thermal load to the lamp refers to thermal load to an arc tube and electrodes of the lamp and can be reduced by a decreased power input.

A variety of techniques have been proposed to achieve light modulation functions or low power lighting of lighting apparatus for high-pressure discharge lamps. These techniques are described below.

The lamp used in a light source of a projector is a high-pressure discharge lamp having a significantly high mercury vapor pressure of, for example, 20 MPa (about 197 atmospheres). The high-pressure discharge lamp has a quartz arc tube and a pair of counter electrodes disposed at a distance of 2 mm or less, and at least 0.15 mg/mm$^3$ of mercury, a rare gas, $10^{-6}$ µmol/mm$^3$ to $10^{-2}$ µmol/mm$^3$ of halogen that are encapsulated in the arc tube (for example, refer to Japanese Patent Application Publication No. H02-148561). Such a type of discharge lamp and its lighting apparatus is disclosed, for example, in Japanese Patent Application Publication No. 2009-527871. A high-pressure discharge lamp disclosed in Japanese Patent Application Publication No. 2000-131668 has an arc tube with a mercury vapor pressure of 15 MPa to 35 MPa at a stationary power lighting mode and contains $10^{-6}$ µmol/mm$^3$ to $10^{-2}$ µmol/mm$^3$ of halogen in the arc tube. A pair of electrodes provided in the arc tube each have a protrusion in the central regions of tips of the electrodes to reduce an arc jump phenomenon, which indicates shift of arc generated between the electrodes in the central regions and their vicinities of the tips of the electrodes. A DC voltage is applied from a power supply unit including a DC/DC converter and a DC/AC inverter to the high-pressure discharge lamp to light the lamp.

A modulated power lighting operation of the high-pressure discharge lamp using the power supply unit at a power that is about 70 to 80% of the rated power consumption and at a frequency of pulse-wave AC current that is identical to that in the stationary power lighting causes a flicker phenomenon. This phenomenon is probably due to unstable thermoelectronic emission from low-temperature electrodes.

An attempt to solve such a problem is formation of small projections at tips of the electrodes during lighting of the high-pressure mercury lamp (such projections are not formed during turning-off of the lamp) to stabilize the arc. Such a technology is disclosed, for example, in Japanese Patent Application Publication No. 2006-332015. The technology disclosed in Japanese Patent Application Publication No. 2006-332015 involves intermittent or periodical intercalation of a low frequency to a stationary frequency depending on the lamp voltage or lamp lighting power and changing the frequency or the number of waves at a low-frequency term to maintain projections that function as arc starting points and thus to stabilize the lamp operation.

SUMMARY

The present invention relates to a lighting apparatus for a high-pressure discharge lamp, comprising: an electric discharge container that comprises of quartz glass and contains a pair of counter electrodes; and a power supply unit that supplies an AC current to the high-pressure discharge lamp, wherein the power supply unit has a stationary power lighting mode and a modulated power lighting mode that supplies current having a power less than a power in the stationary power lighting mode, wherein the modulated power lighting mode supplies a rectangular AC current having a first term and a second term, wherein a mean high-frequency current value supplied to a first electrode is greater than a mean current value supplied to a second electrode in the first term, and wherein a current is supplied to the second electrode for a term longer than the half-cycle period in the second term, the current being lower than the mean high-frequency current value supplied to the first electrode.

Further, the high-frequency current in the first term may be at least two cycles. The mean current value supplied to the first electrode may be 100% to 450% of the mean current value supplied to the second electrode, in the first term. The frequency of the high-frequency current in the first term may be at least 80 Hz. The polarity may not be switched in the second term. The term that supplies the current to the second electrode in the second term may be an integral multiple of the half-cycle period of the high-frequency current to the first electrode in the first term. The sum of the first term and the second may be 25 ms or less. The ratio of the first term to the second term may range from 0.2 to 10.5. The summation of power disproportionately applied to the first electrode in the first term $\Delta Sa$ and the summation of power disproportionately applied to the second electrode in the second term $\Delta Sb$ may satisfy the relation: $0.27 \leq \Delta Sa/\Delta Sb \leq 10.5$. The power supply unit may comprise a switching means capable of switching the polarity of the high-frequency electric current supplied during the first term and the current supplied during the second term. The disproportionate ratio of waveforms during the first term may be changed by the voltage, current, or power of the lamp. The power supply unit may have a plurality of waveforms for at least one term of the half-cycle period, the first term, and the second term in the modulated power lighting mode, and supplies an electric current selected from the plurality of waveforms based on the lighting state of the lamp during the at least one term. The power supply unit may switch to an electrode recovering power that is higher than the power in the modulated power lighting mode during a certain period at predetermined elapsed time intervals.

Furthermore, the power supply unit may supply the electrode recovering power that is lower than the power in the stationary power lighting mode. In the term supplying the electrode recovering power, the power supply unit may gradually increase the power from the power of the modulated power lighting mode to the electrode recovering power, reduce the current disproportionate ratio of the waveform in the first term, maintains the electrode recovering power during a predetermined period, and gradually decrease the power from the second power to the power of the modulated power lighting mode while gradually increasing the current disproportionate ratio of the waveform in the first term. The power supply unit may gradually change the half cycle period of the second term in the term supplying the electrode recovering power. The power supply unit may invert the polarity of one electrode of the first and second electrodes to which the power is supplied during the second term in the modulated power lighting mode, after the supply of the electrode recovering power. The power supply unit may have a plurality of waveforms for at least one term of the half-cycle period, the first term, and the second term in the modulated power lighting mode, or the term supplying the electrode recovering power, or the modulated power lighting mode and the term supplying the electrode recovering power, and supply an electric current having one waveform selected from the plurality of waveforms based on the lighting state of the lamp during the at least one term. The power supply unit may control terms such that any one term of the half-cycle period, the first term, and the second term in the modulated power lighting mode is shorter than the corresponding term in the electrode recovering power supply mode, in the case where the modulated power lighting mode is switched after the supply of the electrode recovering power or during a predetermined term after switching to the modulated power lighting mode. The power supply unit may control powers such that the accumulated power input to one electrode of the first and second electrodes having a higher disproportionate ratio during the anode phase is greater than the accumulated power input to the other electrode during the anode phase, in the electrode recovering power supply term.

The present invention may also relate to a projector comprising the lighting apparatus for a high-pressure discharge lamp as described above, a control unit comprising an image controller that processes image signals and a lighting controller that controls lighting of the high-pressure discharge lamp, a light modulation device, and a magnifying device.

BRIEF DESCRIPTION OF THE DRAWINGS

Other features and advantages of the present lighting apparatus for high-pressure discharge lamp and projector will be apparent from the ensuing description, taken in conjunction with the accompanying drawings, in which:

FIG. 8 is a table showing the experimental results on a lighting apparatus for a high-pressure discharge lamp of the present invention;

FIGS. 12A through 12D each is a schematic view illustrating the shape of electrodes of a high-pressure discharge lamp of a lighting apparatus in accordance with an embodiment of the present invention;

FIG. 13 is a simplified timing chart of the waveform of current and voltage supplied to a high-pressure discharge lamp of a lighting apparatus in accordance with an embodiment of the present invention;

FIGS. 18A through 18D each is a schematic illustration of the states of electrode tips when a plurality of selectively combined current waveforms is applied to a lighting apparatus for a high-pressure discharge lamp in accordance with an embodiment of the present invention;

FIGS. 24A through 24C are schematic illustration of electrodes when a high-pressure discharge lamp is lighted using a single current waveform determined through experiments;

FIG. 25 is a timing chart of a voltage waveform, frequency waveform, and current waveform, respectively, in accordance with another embodiment of the present invention;

FIGS. 28A through 28D each is a schematic illustration of deformation of protrusions of electrodes in a conventional lighting apparatus for a high-pressure discharge lamp;

FIG. 29 illustrates an example of behaviors of a current waveform and electrode temperature of a conventional high-pressure discharge lamp.

DESCRIPTION

Figure 1:
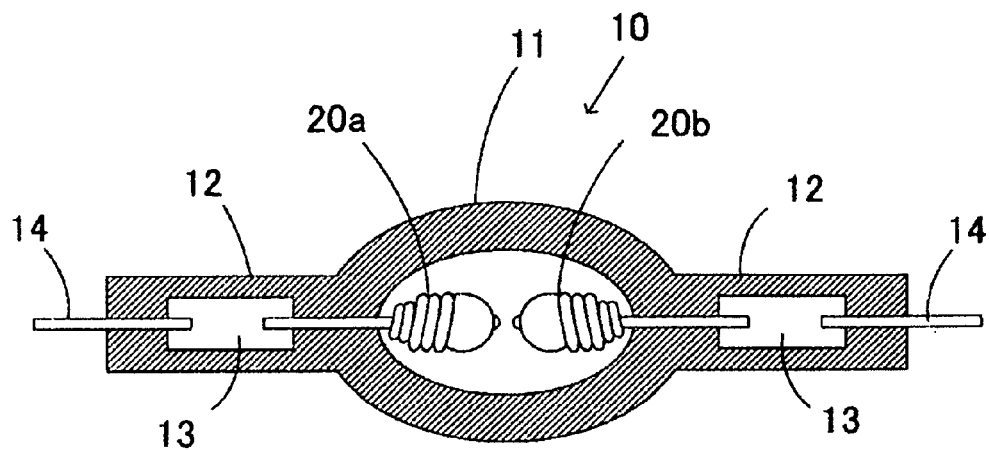
FIG. 1 is a cross-sectional view of a high-pressure discharge lamp of a lighting apparatus in accordance with an embodiment of the present invention.

Unfortunately, the technology discussed in the background is not effective for lamp stabilization, which results in a flicker phenomenon due to unstable arc luminescent spots. In addition, blackening may occur in the arc tube in some cases. These phenomena will be described in detail below.

The inventors observed flickering at arc luminescent spots in a modulated power lighting mode in which power was gradually decreased during an AC driving operation. For example, a high-pressure discharge lamp of a rated power consumption of 180 W was driven at a rated power (180 W) while the power was gradually varied. Although the lamp was driven at an unstable condition of 150 W or more and at a frequency that is the same as that of the rated operation (hereinafter, referred to as "rated frequency"), projections at the tips of the electrodes were deformed at lower power. The operational frequency in modulated lighting (hereinafter, referred to as modulated lighting frequency) was set to be lower than the rated operational frequency based on the technology disclosed in Japanese Patent Application Publication No. 2006-332015, and a low frequency was intermittently intercalated to stabilize the projections. Although the lamp was driven at a stable state even at a low power of 130 W, the projections were deformed at a lower power in every frequency.

The deformation of the projections is explained with reference to FIG. 28, which schematically illustrates projections 21 at tips of electrodes 20a and 20b of a high-pressure discharge lamp. An arc A is formed between the electrodes 20a and 20b. During rated power lighting of the high-pressure discharge lamp, tungsten, which is electrode material, is evaporated by heat and is compounded with halogen. The compound flows toward the arc plasma by convection and is dissociated into positive ions. The positive ions are attracted to a region of the arc spot, which is the center of the electric field at the tip of the electrode at an anode phase, and are deposited on the tip. After the electrode is inverted into a cathode phase, electrons collide with the entire electrode to lead an increase in the electrode temperature, resulting in re-evaporation of tungsten deposited during the cathode phase. During rated power lighting, a stable balance is achieved between the deposition and the evaporation at a level to maintain proper projections at the electrode tips. (FIG. 28(a)). During a modulated operation, that is, lighting at a lower power than the stationary lighting power, the temperature of the electrode tip at the cathode phase is lower than that during the stationary power lighting. This leads to a change in emission of electrons from a diffuse mode to a spot mode. As a result, the arc spot, to which the arc is concentrated, is limited to a point of the tip 21 of the electrode (FIG. 28(b)). In other words, the projection has a point to which the electric field is concentrated and other points to which the electric field is not concentrated. Since the temperature of the arc spot portion is significantly high, tungsten in the cathode phase evaporates, resulting in deformation of the tip 21' (FIG. 28(c)). The temperature at the arc spot decreases in some deformed shape, and the arc spot shifts to any other position (FIG. 28(d)). Repeating such a phenomenon results in deformation of the projection into a trapezoidal shape, repeated shift of the luminescent spot or so-called arc jump, which is observed as flickering on the projected screen. The phenomenon of the shift of the arc luminescent spots at the electrodes of the modulated power lighting can be summarized as follows:

As the temperature at the electrode tip decreases due to decreased input thermal energy to each electrode accompanied by a decrease in electric power, unstable thermoelectronic emission occurs in the cathode phase. As a result, the diffuse mode is transferred to the spot mode, which facilitates shift of the luminescent spot (arc jump). A decrease in the temperature of the electrode tip precludes melting of the surface layer of the electrode chip. Since the electrode tip is thereby rounded, the point of discharge is not stabilized. This leads to deposition of tungsten (arc attachment) over a wide area without concentration into a narrow range and thus low efficiency of propagation of the projection. As a result, the temperature at the electrode tip further decreases. The position having a high temperature of the electrode is varied for every polarity reversal by such deposition of tungsten over a wide area, resulting in flickering due to arc jump.

Next, modulated power lighting was performed using a lighting waveform at the stationary power lighting in the conventional techniques described above. None of them solved such a problem. For example, in the technique disclosed in Japanese Patent Application Publication No. 2000-131668, flickering can be reduced by reducing occurrence of the arc jump through minimization of the frequency of polarity reversal that is achieved by application of a current waveform similar to DC lighting. This countermeasure, however, cannot basically prevent flickering due to arc jump by polarity reversal because the temperature of one of the electrodes does not increase.

Figure 30:
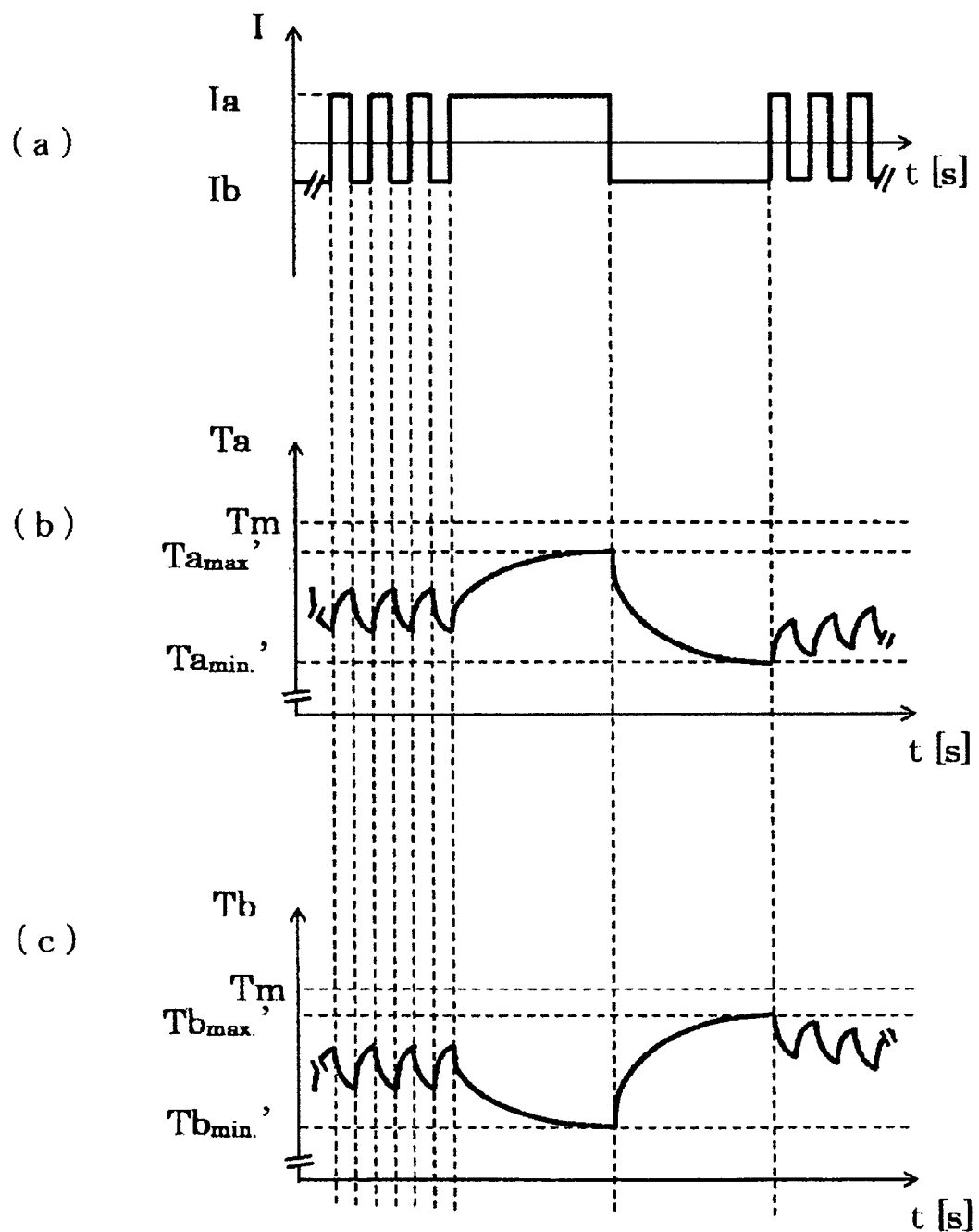
FIG. 30 illustrates an example of behaviors of a current waveform and electrode temperature during a modulated power lighting of a conventional high-pressure discharge lamp.

Based on such results, the inventors reinvestigated AC driving. Since AC driving of a lamp causes alternation of an anode phase accompanied by an increase in the electrode temperature and a cathode phase accompanied by a decrease in the electrode temperature, the temperature rise would be probably limited in the case of high-frequency lighting. To avoid such arc jump, intermittent intercalation of a flow frequency may be effective to raise the temperature at the electrode tip. However, such a countermeasure is insufficient in the modulated power lighting mode, because flickering often occurs due to the shift of the luminescent spot in the spot mode. With reference to FIGS. 29 and 30, the behavior of the temperature at the electrode tip is presumed in order to find the reason for the flickering.

FIGS. 29 and 30 are examples of lighting waveforms the inventors investigate based on the technique disclosed in Japanese Patent Application Publication No. 2006-332015, and show changes in current and temperature of the electrode tip with time when a low frequency fL is intermittently intercalated during lighting at a high frequency fH. FIG. 29 illustrates changes in current and temperature at the electrode tip in a stationary power lighting mode, while FIG. 30 illustrates changes in current and temperature at the electrode tip in a modulated power lighting mode. In FIGS. 29 and 30, the lateral axis represents time, while the longitudinal axis represents current from one to the other of the counter electrodes in FIGS. 29(a) and 30(a), temperature Ta of the electrode 20a in FIGS. 29(b) and 30(b), or temperature Tb of the electrode 20b in FIGS. 29(c) and 30(c).

At the stationary power lighting mode shown in FIG. 29, the electrode undergoes electron impact in the anode phase and is heated by the kinetic energy of electrons generated by the electron temperature in the plasma and the anode fall voltage. At the cathode phase, it is believed that the temperature of the electrode tip decreases due to high contribution of cooling by emission of electrons in spite of energy input by cation collision caused by the cathode fall voltage. Accordingly, temperature rise during the anode phase and temperature fall during the cathode phase are alternately repeated at the electrode tip, corresponding to the current frequency. As shown in FIGS. 29(b) and 29(c), each electrode reaches the maximum temperature Tamax and the minimum temperature Tamin at a low frequency. In the stationary power lighting mode, the maximum temperature Tamax by the low frequency significantly exceeds a temperature Tm necessary for melting of the electrode tip, resulting in a sufficient stabilization of the luminescent spot.

With reference to FIG. 30, a modulated power lighting mode is explained. In this case, the lighting power is low. Thus, the maximum temperatures Tamax and Tbmax cannot reach the temperature Tm necessary for melting of the electrode tip (necessary for stabilization of the luminescent spot) even if a low frequency is intercalated. A possible measure is an increased number of low frequency intercalation cycles to further increase the electrode temperature; however, a further reduction in the frequency to, for example, about 10 Hz causes flickering due to another factor, i.e., a visual change in current in the polarity reversal.

Lighting only by a low frequency leads to temperature rise over a broad range of the electrode due to an increased diffusion length of the heat received from electrons at the electrode in the anode phase. This leads to melting of a wide area of electrode tip, and rounding of the electrode tip with the lighting time. It is believed that this phenomenon occurs by deposition of melted tungsten over the broad area for a long term in the anode phase. The thickening of the projection precludes the temperature rise of the electrode tip due to an increase in heat capacity of the tip as the lighting time elapses. As a result, the temperature at the electrode tip decreases in the cathode phase, resulting in flickering by the shift of the luminescent spot.

Accordingly, the most fundamental issue in the modulated power lighting mode is flickering due to the shift of the luminescent spot that occurs by the temperature fall at the projection of the electrode tip in the cathode phase relative to the stationary power lighting mode. In high-frequency lighting using simple rectangular waves, the maximum temperature at the projection of the electrode tip is insufficient. Although the maximum temperature can be raised in low-frequency lighting, the flickering due to a variation in current during the polarity reversal as described above and thickening of the electrode tip with elapsed lighting time lead to shift of the luminescent spot after a certain time. Accordingly, the problem is still unsolved.

An object of the present invention is to provide a lighting apparatus for a high-pressure discharge lamp that exhibits a stable arc luminescent spot of a discharge lamp and can be lighted with reduced blackening of the lamp arc tube in a modulated power lighting mode. Another object of the present invention is to provide a projector having a stationary power lighting mode and a modulated power lighting mode in which the power of a high-pressure discharge lamp can be reduced to the minimum and flickering can be suppressed up to the end of life of the high-pressure discharge lamp.

The inventors, for solving the problems described above, have investigated technology that involves rounding the surface layer of a projection of an electrode tip to stabilize the point of a luminescent spot in a modulated power lighting mode, so that the temperature of the electrode tip is raised at the start of a cathode phase to reduce the shift of the luminescent spot.

Thus, the objects described above are achieved by a lighting apparatus for a high-pressure discharge lamp that comprises an electric discharge container made from quartz glass and containing a pair of counter electrodes; and a power supply unit that supplies an AC current to the high-pressure discharge lamp, wherein the power supply unit has a stationary power lighting mode and a modulated power lighting mode that supplies current having a power less than a power in the stationary power lighting mode; the modulated power lighting mode supplies a rectangular AC current having a first term ($\tau 1$) and a second term ($\tau 2$); a mean high-frequency current value (I1a) supplied to a first electrode (20a) is greater than a mean current value (I1b) supplied to a second electrode (20b) in the first term ($\tau 1$); and a current (I2) is supplied to the second electrode (20b) for a term longer than the half-cycle period ($\tau 0$) in the second term ($\tau 2$), the current (I2) being lower than the mean high-frequency current value (I1a) supplied to the first electrode.

Preferably, the high-frequency current in the first term ($\tau 1$) is at least two cycles. The mean current value (I1a) supplied to the first electrode (20a) is 100 to 450% of the mean current value (I1b) supplied to the second electrode (20b), in the first term ($\tau 1$). The frequency of the high-frequency current in the first term ($\tau 1$) is at least 80 Hz. The polarity is not switched in the second term ($\tau 2$). The term that supplies the current to the second electrode (20b) in the second term ($\tau 2$) is an integral multiple of the half-cycle period ($\tau 0$) of the high-frequency current to the first electrode (20a) in the first term ($\tau 1$). The sum ($\tau 1 + \tau 2$) of the first term ($\tau 1$) and the second term ($\tau 2$) is 25 [ms] or less. The ratio ($\tau 1/\tau 2$) of the first term ($\tau 1$) to the second term ($\tau 2$) ranges from 0.2 to 10.5. The summation $\Delta Sa$ [A·ms] of power disproportionately applied to the first electrode (20a) in the first term ($\tau 1$) and the summation $\Delta Sb$ of power disproportionately applied to the second electrode (20b) in the second term ($\tau 2$) satisfy the relation: $0.27 \leqq \Delta Sa/\Delta Sb \leqq 10.5$. The power supply unit includes switching means capable of switching the polarity of the high-frequency electric current supplied during the first term ($\tau 1$) and the electric current supplied during the second term ($\tau 2$). The disproportionate ratio (I1a/I1b) of waveforms during the first term ($\tau 1$) is changed by the voltage, current, or power of the lamp. The power supply unit has a plurality of waveforms for at least one term of the half-cycle period ($\tau 0$), the first term ($\tau 1$), and the second term ($\tau 2$) in the modulated power lighting mode, and supplies electric current selected from the plurality of waveforms based on the lighting state of the lamp during the at least one term.

Further, the power supply unit may switch to electrode recovering power that is higher than the power in the modulated power lighting mode during a certain period at predetermined elapsed time intervals.

Preferably, the electrode recovering power is lower than the power in the stationary power lighting mode. In the term supplying the electrode recovering power, the power supply unit gradually increases the power from the power of the modulated power lighting mode to the electrode recovering power, reduces the current disproportionate ratio (I1a/I1b) of the waveform in the first term ($\tau 1$), maintains the electrode recovering power during a predetermined period, and gradually decreases the power from the second power to the power of the modulated power lighting mode while gradually increases the current disproportionate ratio (I1a/I1b) of the waveform in the first term ($\tau 1$). The power supply unit gradually changes the half cycle period of the second term ($\tau 2$) in the term supplying the electrode recovering power. The power supply unit inverts the polarity of one electrode of the first and second electrodes to which the power is supplied during the second term ($\tau 2$) in the modulated power lighting mode, after the supply of the electrode recovering power. The power supply unit has a plurality of waveforms for at least one term of the half-cycle period ($\tau 0$), the first term ($\tau 1$), and the second term ($\tau 2$) in the modulated power lighting mode and/or the term supplying the electrode recovering power, and supplies an electric current having one waveform selected from the plurality of waveforms based on the lighting state of the lamp during the at least one term. The power supply unit controls terms such that any one term ($\tau 0$, $\tau 1$, or $\tau 2$) of the half-cycle period ($\tau 0$), the first term ($\tau 1$), and the second term ($\tau 2$) in the modulated power lighting mode is shorter than the corresponding term ($\tau 0$, $\tau 1$, or $\tau 2$) in the electrode recovering power supply mode, in the case where the modulated power lighting mode is switched after the supply of the electrode recovering power and/or during a predetermined term after switching to the modulated power lighting mode. The power supply unit controls powers such that the accumulated power input to one electrode of the first and second electrodes having a higher disproportionate ratio (I1a/I1b) during the anode phase is greater than the accumulated power input to the other electrode during the anode phase, in the electrode recovering power supply term.

Furthermore, a projector in accordance with the present invention may includes the lighting apparatus for a high-pressure discharge lamp of anyone of the aspects described above; a control unit including an image controller that processes image signals and a lighting controller that controls lighting of the high-pressure discharge lamp; a light modulation device; and a magnifying device.

In the lighting apparatus for a high-pressure discharge lamp of the present invention, a rectangular AC current including a first term ($\tau 1$) and a second term ($\tau 2$) is supplied in a modulated power lighting mode, a high-frequency current having a mean current value (I1a) supplied to a first electrode (20a) higher than a mean current value (I1b) supplied to a second electrode (20b) in the first term ($\tau 1$), a current (I2) lower than the mean current value (I1a) supplied to the first electrode is supplied to the second electrode (20b) for a term longer than the half-cycle period ($\tau 0$) of the high-frequency current in the second term ($\tau 2$). Such a configuration can reduce the shift of a luminescent spot of the arc and can raise the attained temperature at the tips of the two electrodes (20a and 20b) to a temperature exceeding the melting temperature (Tm) of the electrodes. Since the deformation of the protrusions can thereby be restrained, the lighting apparatus for a high-pressure discharge lamp does not generate arc jump, blackening of the arc tube, or flickering and thus has a prolonged service life. The projector of the present invention allows the high-pressure discharge lamp to be lighted at brightness that meets the status of use and to be driven at the minimized power consumption in the modulated power lighting mode, and can projects fresh images without flickering until the end of life of the high-pressure discharge lamp.

Figure 6A:
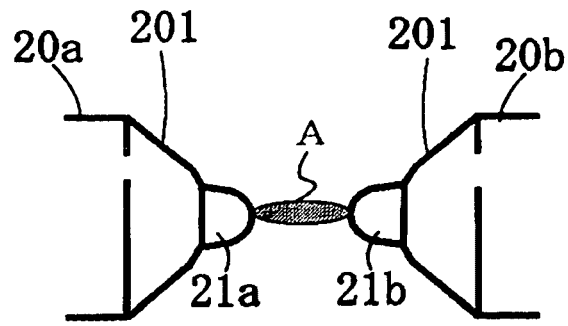
FIGS. 6A through 6D each illustrates a variation in protrusions of electrodes during a modulated power lighting mode in a lighting apparatus for a high-pressure discharge lamp in accordance with an embodiment of the present invention.
Figure 6B:
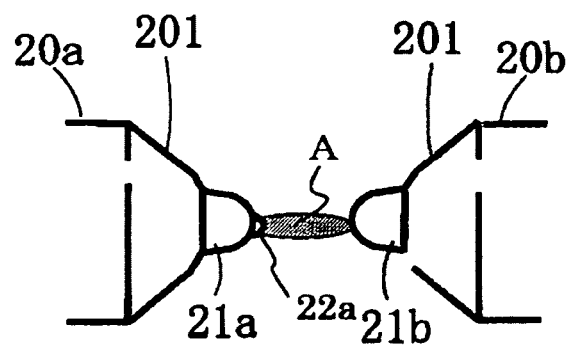
Figure 6C:
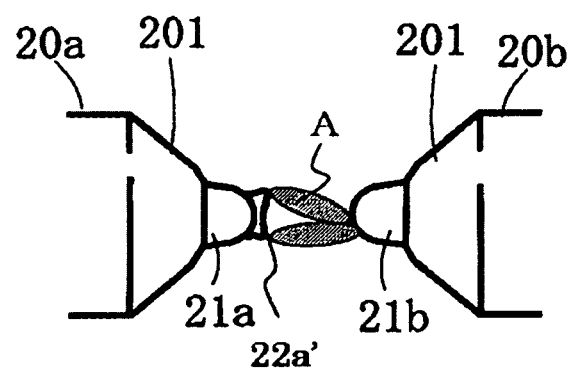
Figure 6D:
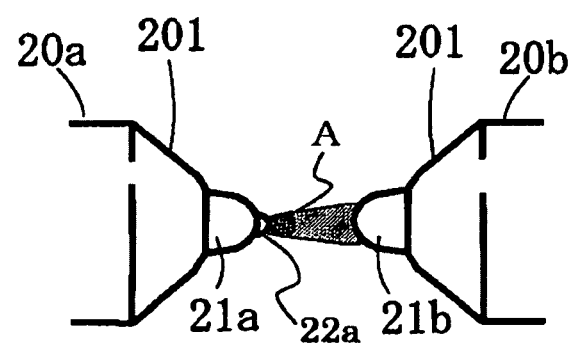
Figure 7:
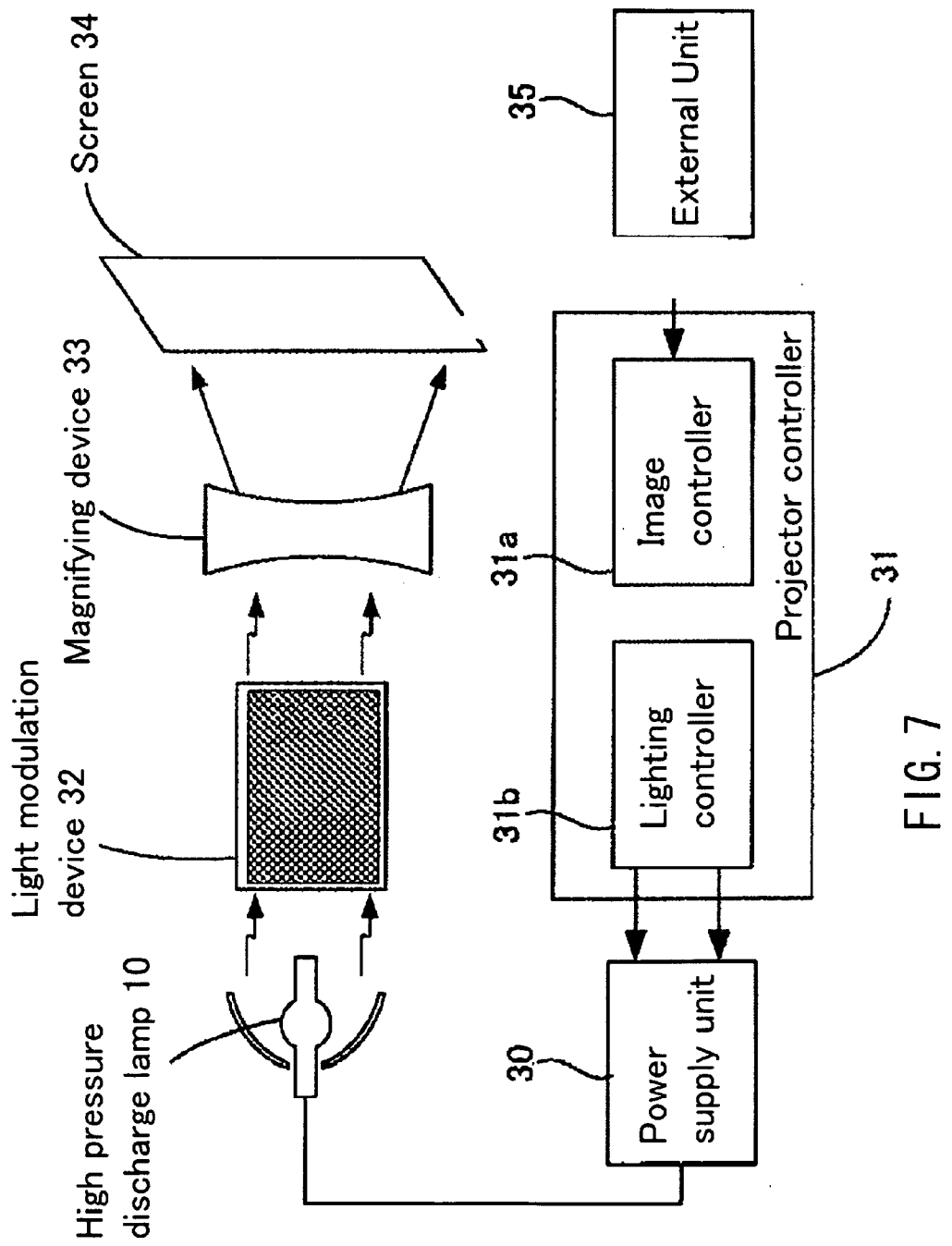
FIG. 7 illustrates a configuration of a projector.

An exemplary high-pressure discharge lamp and projector in accordance with the present invention are described with reference to FIGS. 1 to 17. The projector of the invention is described with reference to a block diagram in FIG. 7, which is used for description of a conventional technique. With reference to FIG. 7, the projector includes a high-pressure discharge lamp 10 provided with a reflective mirror; a power supply unit 30 supplying electric power to the high-pressure discharge lamp 10; a control unit 31 controlling the operation of the projector body (hereinafter referred to as projector control unit 31); and a light modulation device 32 composed of a liquid crystal device; and a magnifying device 33 including a projection lens enlarging an image displayed on the light modulation device 32. The image enlarged by the magnifying device 33 is projected onto a screen 32. The projector control unit 31 includes an image controller 31a that processes image signals sent from an external device 35 such as a personal computer and a lighting controller 31b that sends a lighting command and a light power command to the lighting apparatus for a high-pressure discharge lamp 30. In the drawing, the light modulation device is a liquid crystal device. Instead, a Digital Light Processor (DPL, trademark) including a Digital Mirror Device (DMD, trademark) may be used.

The power supply unit 30 is switchable between a "stationary power lighting mode" that supplies about 80 to 100% power of the rated power consumption of the high-pressure discharge lamp and a "modulated power operation mode" that supplies about 25 to 80% power of the rated power consumption of the high-pressure discharge lamp, as described above. The switching operation will be described later in detail.

A high-pressure discharge lamp, which is a light source of the projector, is exemplified in FIG. 1. The high-pressure discharge lamp is explained with reference to FIG. 1. The high-pressure discharge lamp 10 includes a substantially global luminescent unit 11 formed of a quartz glass discharge container. A pair of electrode 20a and 20b faces each other at an extremely small distance of 2 mm or less in the luminescent unit 11. The luminescent unit 11 has sealing portions 12 at its two ends A. A molybdenum metal foil 13 is hermetically embedded in each sealing portion 12, for example, by shrink sealing. The metal foil 13 is connected to the axle of the electrode 20a or 20b at one end and to an external lead 14 receives electric power from the power supply unit (30) at the other end.

Mercury, a rare gas, and a halogen gas are encapsulated in the luminescent unit 11. Mercury is used for production of radiant light of a desired visible light wavelength range, for example, of a wavelength of 360 nm to 780 nm, and is incorporated in a density of at least 0.15 mg/mm$^3$. Such a density enables the vapor pressure in the arc tube to be at least 200 atmospheres during a lighting mode, depending on, for example, temperature. A higher density of mercury contributes to a discharge lamp having a higher mercury vapor pressure of, for example, at least 250 or 300 atmospheres during a lighting mode. As the mercury vapor pressure increases, the light source is more suitable for a projector.

The encapsulated rare gas is, for example, argon in a pressure of about 13 kPa. The rare gas improves lighting starting properties. Halogen such as iodine, bromine, or chlorine is encapsulated in the form of a compound with a metal such as mercury. The density of halogen ranges from $10^{-6}$ µmol/mm$^3$ to $10^{-2}$ µmol/mm$^3$. Halogen contributes to prolonged life by a so-called halogen cycle, and prevents devitrification of the discharge container in the case of a compact high-pressure discharge lamp having a significantly high lighting vapor pressure of the present invention. Typical specifications of the high-pressure discharge lamp are as follows: maximum outer diameter of the luminescent unit: 9.4 mm, distance between electrodes: 1.0 mm, internal volume of the arc tube: 55 mm$^3$, rated voltage: 70 V, rated power: 180 W, and AC lighting.

Since such a discharge lamp is mounted in a compact projector, it needs reduced overall dimensions and high luminous intensity. Such requirements give significantly severe thermal load to the luminescent unit. The load on the wall of the lamp tube ranges from 0.8 to 2.5 W/mm$^2$, typically 2.4 W/mm$^2$. Apparatuses for presentation, such as projectors and overhead projectors including discharge lamps having such a high mercury vapor pressure and load, on the wall can emit radiant light having excellent color rendering characteristics.

Figure 2A:
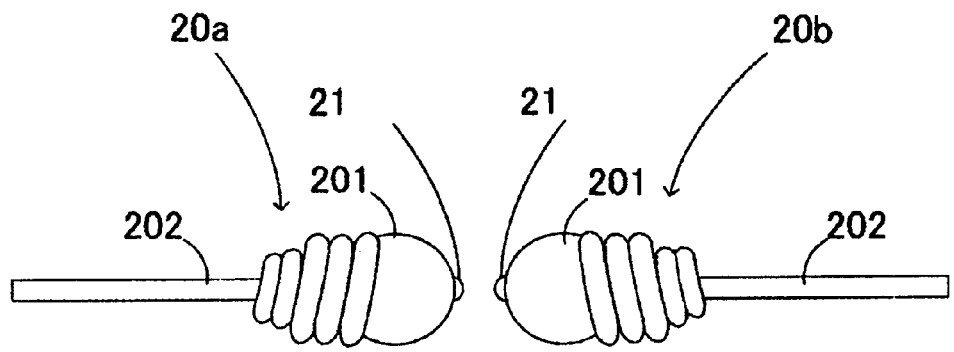
FIGS. 2A and 2B each is a schematic view of electrodes of a high-pressure discharge lamp of a light emitting apparatus in accordance with an embodiment of the present invention.
Figure 2B:
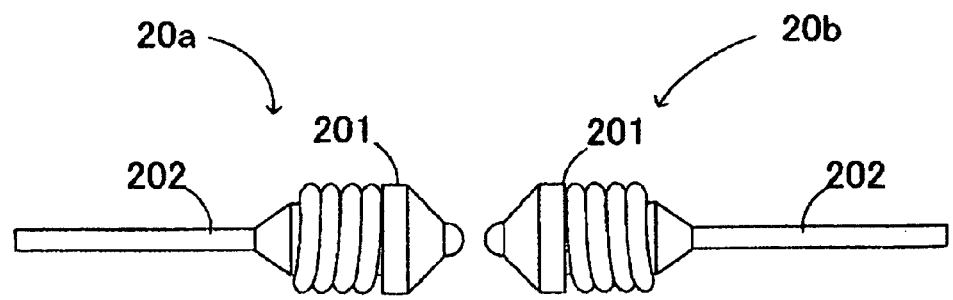

FIG. 2 is an enlarged schematic view of the tips of the electrodes shown in FIG. 1, for explanation of protrusions formed at the tips of the electrodes during the operation of the lamp. The electrodes 20a and 20b each includes a sphere 201 and an axle 202, the sphere 201 has a protrusion 21 at its tip. The protrusion 21 is formed by deposition of tungsten that is melted at the electrode tip during a lighting mode of the lamp. The electrodes 20 may have a shape shown in FIG. 2(b). The electrodes shown in FIG. 2(b) each have a sharp tip compared to the spherical tip, and improve the utilization factor of the light flux at a high-brightness portion. A portion 201 having a large diameter corresponds to the sphere 201 in FIG. 2(a), and a protrusion 21 is formed at the tip. Arc discharge occurs between the protrusions 21 at the electrode tips, and light of the arc is not intercepted by the spheres 201 of the electrodes, resulting in a high utilization factor of light. As a result, the projector can project bright images. As is schematically illustrated in FIG. 2, the axle 202 has an element having a larger diameter than that of the axle and corresponding to the sphere.

A power supply unit to drive the high-pressure discharge lamp is described with reference to FIG. 3. The power supply unit (30) includes a step-down chopper circuit 1 receives a DC voltage; a full-bridge inverter circuit 2 (hereinafter, also referred to as full-bride circuit) that is connected to the output of the step-down chopper circuit 1, converts the DC voltage to an AC voltage, and supplies the AC voltage to a discharge lamp 10; a coil L1, a capacitor C1, and a starter circuit 3, that are series-connected to the discharge lamp 10; a driver 4 that drives switching devices Q1 to Q4 of the full-bridge circuit 2; and a control unit 5. The control unit 5 is, for example, a processing device, such as microprocessor of which the functional configuration is shown by a block diagram in FIG. 3.

Figure 3:
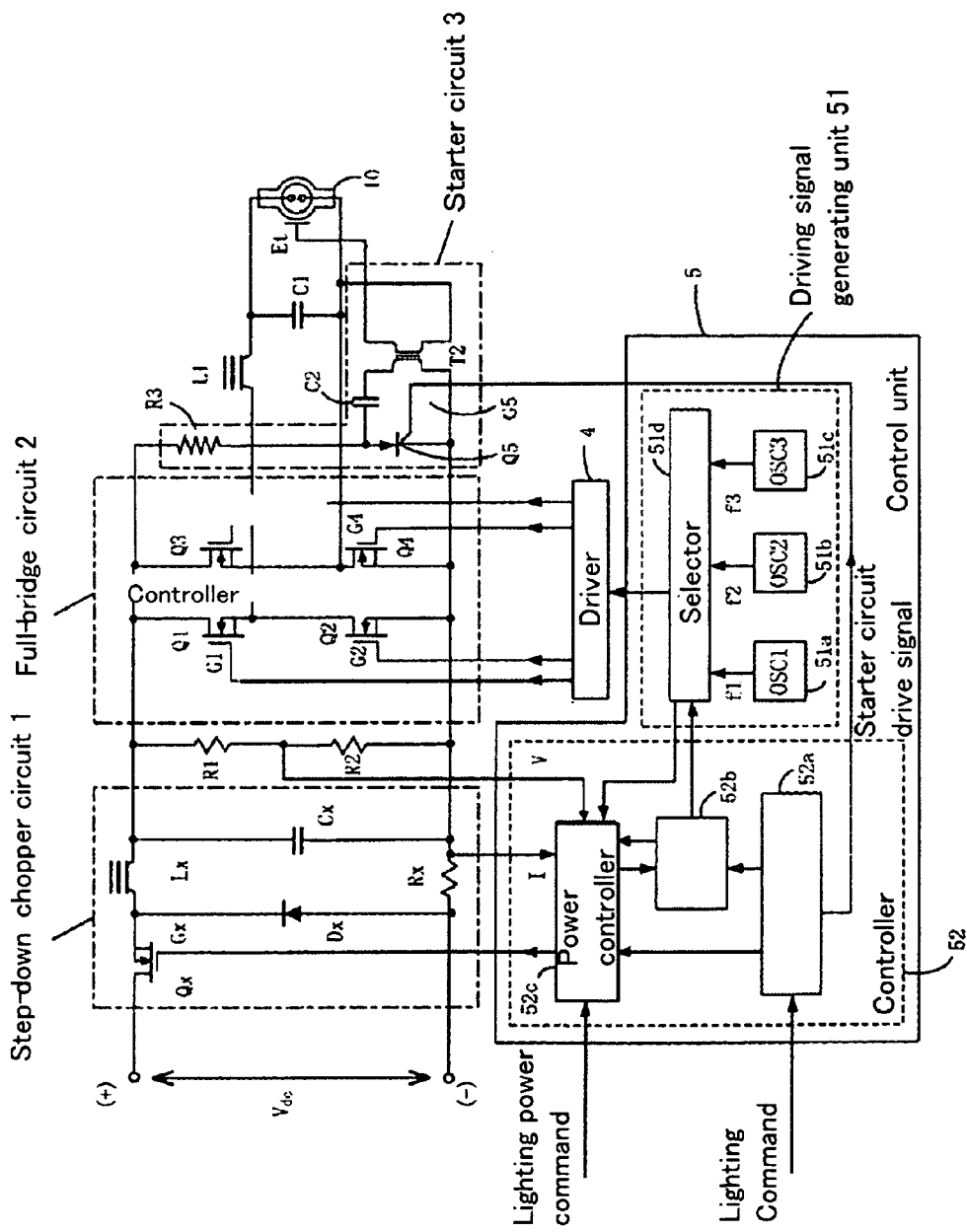
FIG. 3 is a schematic view illustrating a configuration of a lighting apparatus for a high-pressure discharge lamp in accordance with an embodiment of the present invention.

With reference to FIG. 3, the step-down chopper circuit 1 includes a switching device Qx and a reactor Lx that are connected to a positive terminal of a DC voltage source; a diode Dx of which the anode is connected to a node between the switching device Qx and the reactor Lx and the cathode is connected to the negative terminal of the DC voltage source; a smoothing capacitor Cx connected to the output of the reactor Lx; and a resistance Rx connected to both the negative terminal of the smoothing capacitor Cx and the anode of the diode Dx for detection of current. The switching device Qx is driven under a predetermined duty to reduce the input DC voltage Vdc to a voltage in response to the duty. A series circuit of resistances R1 and R2 for detection of voltage is provided at the output of the step-down chopper circuit 1. The full-bridge circuit 2 includes bridge-connected switching devices Q1 to Q4. The switching devices Q1 and Q4 and the switching devices Q2 and Q3 are alternately turned on to generate a rectangular AC voltage between the connection node of the switching devices Q1 and Q2 and the connection node of the switching devices Q3 and Q4. The starter circuit 3 includes a series DC circuit of a resistance R3 and a switching device Q5, a capacitor C2, and a transformer T1. Upon turning on the switching device Q5, charge accumulated in the capacitor C2 is discharged through the switching device Q5 and the primary coil of the transformer T1 to generate high-voltage pulses at the secondary coil of the transformer T1. This high voltage is applied to an auxiliary electrode Et of the discharge lamp 10 turn on the lamp 10.

The circuit can be driven at a minimum time interval τ0 by adjusting the switching cycle of the switching devices Q1 to Q4 of the full-bridge circuit 2, and the output voltage can be controlled by adjusting the operation duty of the switching device Qx of the step-down chopper circuit 1. The switching device Qx of the step-down chopper circuit 1 is turned on or off in response to the duty of the gate signal Gx to vary the power to be supplied to the lamp 10. In other words, the gate signal Gx is controlled to match the input power adjusting signal value. For example, if the power is increased, the duty of the switching device Qx is decreased. FIG. 4 illustrates an exemplary current waveform that is output in such a manner, where the lateral axis is time and the longitudinal axis is current.

The control unit 5 includes a means 51 for generating driving signals and a controller 52. The means 51 for generating driving signals includes, for example, AC signal generators 51a and 51b, an asymmetric rectangular wave signal generator 51c that generates rectangular waves having asymmetric driving terms composed of a minimum time width τ0, and a selector 51d that selects the outputs from the AC signal generators 51a and 51b and asymmetric rectangular wave signal generator 51c and generates driving signals to drive the switching devices Q1 to Q4 of the full-bridge circuit 2. The controller 52 includes a lighting controller module 52a that controls the lighting operation of the lamp 10 and a power control modules 52c that drives the switching device Qx of the step-down chopper circuit 1 at a predetermined duty in response to an external lighting power command in order to control the power of the lamp. The controller 52 also includes a frequency selecting module 52b that sends a frequency selection command to the selector 51d of the means 51 for generating driving signals in response to switching between the stationary power lighting mode and the modulated power lighting mode driven at a power of 0.8×P (W) or less, in order to set the driving signals of the switching devices Q1 to Q4.

The power control modules 52c determines a lamp current I and a lamp voltage V from a voltage across the current-detecting resistance Rx and voltage-detecting resistances R1 and R2, calculates the lamp power, and control the duty of the switching device Qx of the step-down chopper circuit 1 such that the lamp power complies with the lighting power command. The selector 51d selectively sends the output from the AC signal generators 51a and 51b and the asymmetric rectangular wave generating module 51c to a driver 4 in response to a command from the frequency selection module 52b. Alternatively, the time width τ0 of the rectangular waves output from the asymmetric rectangular wave generating module 51c may be increased or decreased in response to an asymmetric-ratio control signal output from the frequency selecting module 52b. The stationary power lighting mode may be switched to the modulated power lighting mode by gradually decreasing the power from 80% or less of the rated power consumption. This can prevent a sudden change in temperature of the electrodes more efficiently. Such a switching to the modulated power lighting mode can be achieved by gradually decreasing the power through control of the duty of the switching device Qx of the step-down chopper circuit 1. As described below, the switching from the modulated power lighting mode to the stationary power lighting mode is performed by a gradual increase in driving power or a gradual decrease in anode driving term of an electrode during an anode operation. For example, the asymmetric ratio is controlled by a gradual increase in the power to be supplied to the lamp by the power controller 52c or by an asymmetric ratio control signal sent to the asymmetric rectangular wave signal generator 51c.

Figure 4A:
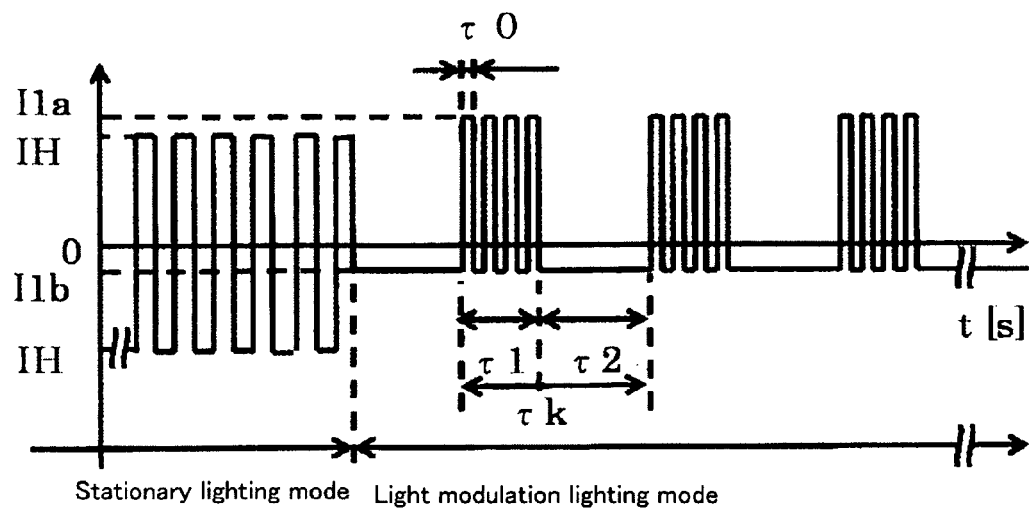
FIGS. 4A and 4B illustrate waveforms supplied to a high-pressure discharge lamp of a lighting apparatus for a high-pressure discharge lamp in accordance with an embodiment of the present invention.
Figure 4B:
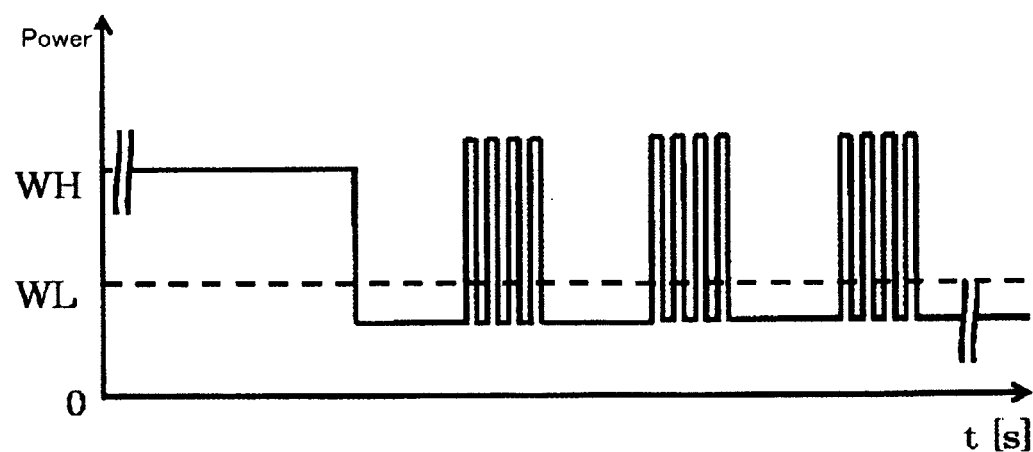
Figure 5:
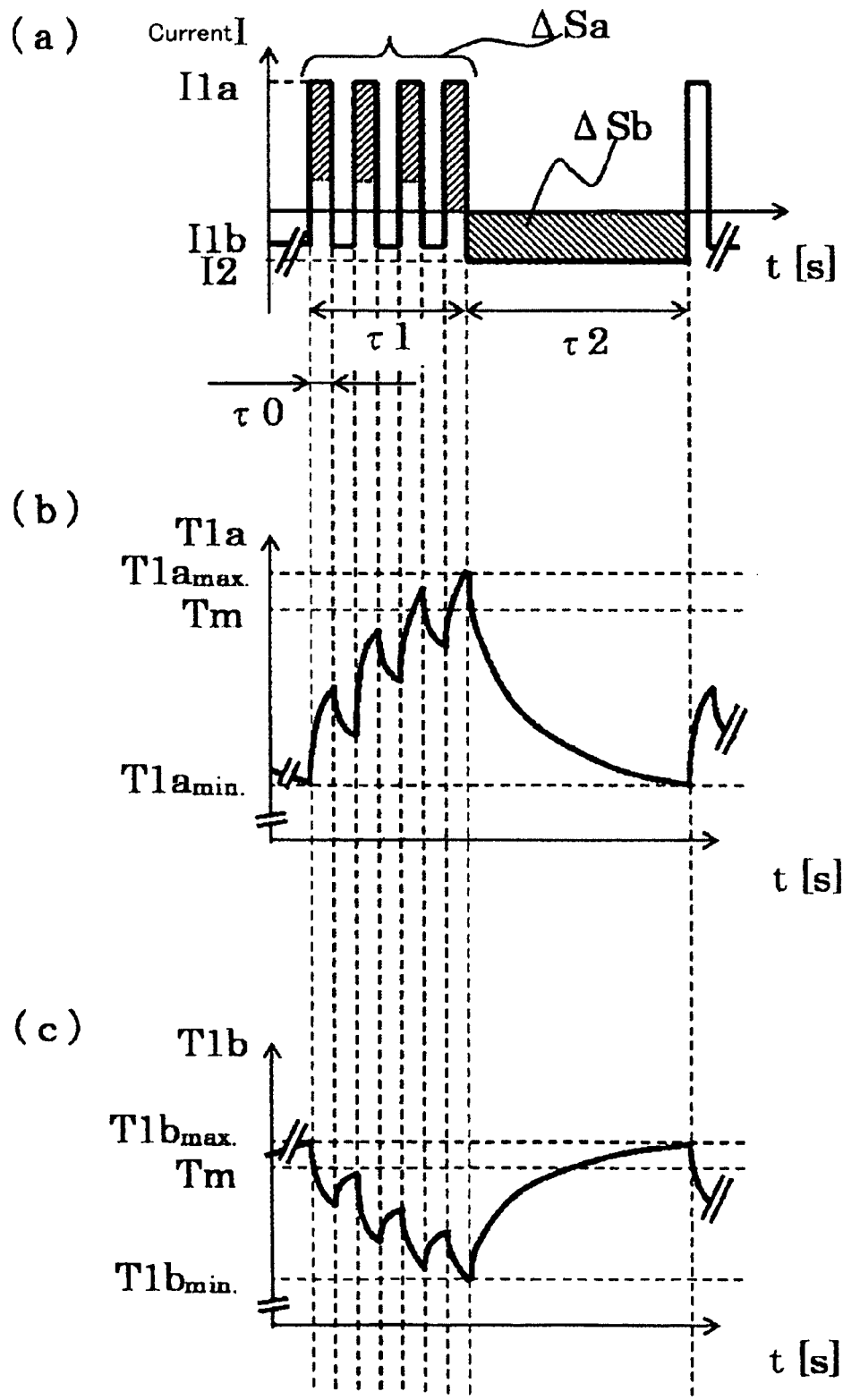
FIG. 5 illustrates behavior of the electrode temperature in the case where a waveform is supplied to a high-pressure discharge lamp of a lighting apparatus in accordance with an embodiment of the present invention.

FIG. 4 illustrates a current waveform in a modulated power lighting mode in the high-pressure discharge lamp 10 and the power supply unit 30. In further detail, FIG. 4 is a time chart illustrating the dependence of the current and the temperature of the electrode tip on time during the modulated power lighting mode; FIG. 4(a) illustrates a current waveform and FIG. 4(b) illustrates the behavior of the power depending on the current. FIG. 5(a) illustrates another current waveform during the modulated power lighting, and FIGS. 5(b) and 5(c) illustrate the behaviors of the tip temperatures Ta and Tb of the electrodes 20a and 20b, respectively. With reference to FIGS. 4(a) and 4(b), in the modulated power lighting mode, disproportionate current is applied to one of the polarities where a high-frequency current is applied during a first term τ1 whereas a half wave of a low-frequency current having a reverse polarity to the disproportionate current is applied during a second term τ2 in a half cycle time τ0. The first term τ1 and the second term τ2 are alternatively switched. During the first term (τ1), a current I1a flows to the electrode 20a during an anode phase while a current I1b (<I1a) flows to the electrode 20b during the anode phase. The current I1a is limited by a current supplied from a lighting power source, but can exceed a current IH in the stationary power lighting mode. During the second term (τ2), a current I2 flows to the electrodes 20b in the anode phase and the current I2 may be equal to the current I1b, as shown in FIG. 4(a). Although details are described below, the output current value can be binarized into a current-disproportionate interval H and a current-nondisproportionate interval L in a lighting control program.

In such a manner, the modulated power lighting mode has the first term and the second term, a disproportionate high-frequency current having one polarity at the first term, and a half wave of a low frequency current (half-wave current) having the other polarity reverse to that in the first term is applied at the second term. Since the electrodes do not reach a temperature forming a stable luminescent spot at the mean current in normal light modulation power, protrusions cannot be recovered; however, the disproportionate current of the waveform described here can increase the tip temperature of a first electrode to stabilize the luminescent spot, while the half wave (half cycle) of a low-frequency current can increase the tip temperature of the second electrode to stabilize the luminescent spot.

The "disproportionate ratio" I1a/I1b (%) refers to imbalance of current values (I1a and I1b) supplied to the first electrode 20a and the second electrode 20b, respectively. The disproportionate ratio is 100% for the same current value (I1a=I1b), or 200% for a current value (I1a) of the first electrode that is two times the current value (I1b) of the second electrode. In the present invention, preferably, the disproportionate ratio I1a/I1b in the first term ranges 100% to 450%, more preferably 150% to 450%, and most preferably 250% to 350%. Preferably, the frequency of the high-frequency current during the first term (τ1) is at least 80 Hz and such a current is applied by a plurality of cycles, for the following reasons: Since the power in the modulated power lighting mode is lower than that in the ordinary mode, application of the disproportionate current in a certain amount is essential for an increase in the tip temperature of the first electrode to stabilize the luminescent spot.

With reference to FIG. 6, the shape of the electrodes is described in the modulated power lighting mode. The electrode 20a functions as an anode while the electrode 20b functions as a cathode, in the current-disproportionate mode. In the modulated power lighting mode, as shown in FIG. 6(b), formation of a secondary protrusion 22a smaller than the protrusion 21 at the electrode tip is effective for narrowing of a region the arc reaches and thus heating the protrusion 22a to a required temperature; however, application of a current having a high disproportionate ratio for a long time causes melting of a broad area of protrusion due to prolonged thermal diffusion, resulting in thickening of the secondary protrusion 22a into a broaden protrusions 22a' as shown in FIG. 6(c). The broaden protrusion leads to an increased heat capacity and a decreased temperature, resulting in flickering during an AC cathode phase.

According to the investigation on a proper frequency range of the waveform during the first term in the modulated power lighting mode by the inventors, the preferred range is 200 to 1000 Hz. At a frequency of the waveform during the first term lower than this range, the luminescent spot is not concentrated into the protrusion tip, while at a frequency higher than this range, the surface roughness on the protrusion at the electrode tip increases.

If the frequency of the high-frequency current during the first term is set to a range of 200 to 1000 Hz, the current disproportionate ratio I1a/I1b must be large so that the protrusion reaches the required temperature by only one current application. However, an excess current causes the protrusion at the electrode tip to deform into an abnormal forked shape. The excess current also leads to severe deformation that cannot be rebuilt into the original shape, and vaporization and diffusion of the electrode material that causes blackening of the arc tube, in rare cases. Of course, an excessively low current disproportionate ratio I1a/I1b does not contribute to heating of the electrode. Furthermore, reductions in cost and size are required in lighting power sources used in such an application. Since use of components having high durability to current runs counter to marketing needs, the lighting current value is limited. From a comprehensive standpoint of these factors, a practically desirable procedure is repetitive heating of the electrode by application of a high frequency with a current less than a predetermined value two or more times. Such a current waveform enables a small stable secondary protrusion to be formed at the electrode tip, resulting in enhanced stability of the luminescent spot at a high frequency.

Preferably, the power or mean current value during the second term is lower than that during the first term. The reason for that is explained with reference to FIG. 6(b). A combination of application of disproportionate current to the first electrode during the first term and application of a power or mean current during the second term lower than that during the first term produces a required modulated lighting power that is a mean power by accumulation of powers during the first term and the second term. In other words, instantaneous application of a minimum power necessary for the modulated power lighting mode can form a small secondary protrusion on the first electrode. In such a variation in power, use of a frequency cannot be observed by users is preferable to avoid flickering. The embodiment on this technique is described below.

According to the inventors' knowledge, the electrode (20b) heated during the second term does not have critical problems, such as deformation of the protrusion, blackening by evaporation and diffusion of tungsten, and increased cost in the lighting power source and maintains a stable shape compared to the electrode (20a) heated during the first term.

An issue to be solved is flickering due to instability of the luminescent spot caused by a decrease in the electrode temperature. In the first electrode 20a, a highly disproportionate current during the first term enables the electrode to reach high temperature. This can reduce the shift of the luminescent spot at the start of the cathode phase during the second term. The second electrode 20b should reach a temperature that can reduce the shift of the luminescent spot during the second term. The inventors confirmed that, during the second term, fixing of the polarity in one direction and application of a current for a sufficiently longer time than the cathode phase at a high frequency during the first term allow the second electrode 20b to reach a temperature that can stabilize the luminescent spot. In more detail, as shown in FIG. 6(d), the luminescent spot of the electrode 20b is formed in an area that is somewhat larger than the area of the luminescent spot formed in the front face of the protrusion of the tip of the electrode 20a, resulting in suppression of the shift of the luminescent spot. Furthermore, the second term with a low frequency of polarity switching can reduce the probability of the shift of the luminescent spot. This significantly contributes to suppression of flickering.

Accordingly, during the second term, the electrode 20b can maintain the initial shape of the protrusion without a prominent variation, for the following reason. A short term of the cathode phase during a first term reduces the drifting time of tungsten ions and deposition of tungsten and thus propagation and thickening of the protrusion. A low current for a long time in the anode phase during the second term gradually and moderately heat the entire electrode. This leads to melting of the rough surface of tungsten deposited on the tip of the electrode without local evaporation or wastage of the electrode and propagation or thickening of the protrusion. As a result, the surface is smoothed. Further investigation based on these satisfactory results will lead to substantially the same advantageous effects by polarity reversal during the second term or intercalation of a very short current intermission term.

In the present invention, preferably, the sum τk of the first term τ1 and the second term τ2 is 25 ms or less or a frequency of 40 Hz or more, for the following reason. If the cycle of the low frequency is increased to raise the maximum attained temperature at low-frequency lighting, the variation of the light intensity can be readily observed due to a low frequency of polarity switching of the current. This limits the increase in the cycle length of variable current. In the case of a projector including a liquid crystal device as a light modulation device (32), preferably the sum τk is 12.5 ms or less or a frequency of 80 Hz or more in consideration of balance between the liquid crystal device and the gradation sequence.

Preferably, the sum τ2 during the second term is a multiple number of the half cycle τ0 of the waveform during the first term, for the following reason. It is preferred that the minimum time unit is set to the half-cycle period τ0 of the high-frequency waveform during the first term, in view of the software program that drives the full-bridge circuit for polarity reversal. In consideration of balance with the driving frequency of the liquid crystal of the projector and the recovering rate, nonuniformity on the screen referred to as so-called scroll bar can be avoided.

In the first term, the difference between the power [A·ms] input to a first electrode (20a) between the power [A·ms] input to a second electrode (20b), in other words, the ratio ΔSa/ΔSb of the power ΔSa [A·ms] disproportionately input to the first electrode (20a) during the first term to the power ΔSb disproportionately input to the second electrode (20b) during the second term preferably lies within the following range:

$$0.27 \leq Sa/\Delta Sb \leq 10.5$$

more preferably $$0.3 \leq \Delta Sa/\Delta Sb \leq 3$$

The balance of the temperatures of these two electrodes 20a and 20b can be maintained at a proper level within such a range.

In the lighting apparatus for a high-pressure discharge lamp of the present invention, the disproportionate ratio (I1a/I1b) of the high-frequency current waveform during the first term can be changed using any parameter, such as the lamp voltage, lamp current, or lamp power. The absolute value or the rate of change of the lamp voltage, lamp current, or lamp power is detected to determine the state of the wastage of the shape of the protrusion at the electrode tip based on the detection. A proper selection and change of the disproportionate ratio of the waveform during the first term (first waveform) can avoid deformation of the shape of the protrusion at the electrode tip, resulting in suppression of flickering, an increase in distance between the electrodes, and blackening.

The lighting apparatus for a high-pressure discharge lamp of the present invention can be operated in a stable state without flickering even in the modulated power lighting mode. The tips of the electrodes, however, may be slightly deformed to displace the position of the protrusions at the tips if the apparatus is operated under the same mode for a long time. Although the protrusion is melted within a significantly narrow region, the melted portion has a certain size, the tip of the protrusion is slightly deformed during long-time lighting, and the position of the protrusion gradually shifts within the narrow region. Such a slight shift of the position of the protrusion is relatively minor for a distance between the electrodes not less than 2.0 mm. At an extremely short distance between the electrodes of less than 2 mm, however, the shift of the position of the protrusion affects the illumination intensity of the screen. In compact LCD panels and digital mirror devices (DMDs, such a slight deformation will affect long-time use. Defects at the electrode tips occurring during long-time lighting in the same mode (polarity) can be eliminated by the following measure, for example.

The shape of the electrode can simply be recovered by timely polarity reversal during the modulated power lighting mode. With reference to FIG. 3, the polarity can be readily reversed, for example, by reverse of the switching devices Q1 to Q4 in the full-bridge circuit 2 by a driver 4. Since this polarity reversal involves switching of the disproportionate electrode that causes slight shift of the luminescent spot, frequent polarity reversal leads to unexpected flickering. It therefore is preferred that such switching is not performed to the utmost extent during which the protrusion at the electrode tip can be maintained. For practical purpose, preferably, the frequency of the polarity reversal is approximately once for several hundreds seconds.

The lighting apparatus for a high-pressure discharge lamp of the present invention has been explained based on the effects by each waveform in the first term and the second term. The reason for combination of the waveform in the first term and the waveform in the second term now is explained in the lighting apparatus for a high-pressure discharge lamp of the present invention. Specifically, problems occurring if only the waveform in the first or second term is alternately applied to the counter electrodes are explained below.

(In the case of repetition of the first term) If the waveform in the first term is alternately applied to the counter electrodes, in other words, if the polarity is merely alternated between the counter electrodes to apply identical currents to the first electrode and the second electrode, the variation in the electrode temperature is averaged and the electrodes do not reach a required temperature (the melting temperature Tm of the electrodes). Thus, the shift of the luminescent spot cannot be avoided. If a set of repeat by multiple times of only the waveform in the first term is alternately applied to the counter electrodes, small secondary protrusions can be formed, so that the arc reaches a narrow region and the protrusions reach the required temperature. When the polarity of this set is reversed, the concentrated luminescent spot formed at one electrode by disproportionate current shifts to the counter electrode, which causes a significant change in brightness distribution. Such a significant change in brightness distribution is observed as flickering in optical systems of current general projectors, although it depends on the integration performance and aperture (intake range of the light flux) of the optical system.

In contrast, in the waveform involving repetition of the first term and the second term of the present invention, the concentrated luminescent spot is continuously present in the current-disproportionate electrode primarily. Thus, the state shown in FIG. 6(d) can be maintained, which does not generate flickering due to a change in brightness distribution. Furthermore, both the electrode tips reach a required temperature (melting temperature Tm of the electrode), resulting in maintenance of the shape of the protrusions.

(In the case of repetition of the second term) If only the waveform in the second term is alternately applied to the counter electrodes, that is, if a low frequency having a sufficiently long cycle is applied to the counter electrode, flickering is readily observed at a frequency of less than 40 Hz of a change in current due to the polarity reversal. For example, if the mean lighting current is set to 50% for 50% modulated lighting power, a low frequency of 40 Hz or less is required so that the first electrode reaches a required temperature. Although this can prevent the shift of the luminescent spot of the electrode, flickering is observed due to a change in current with a low frequency (flickering due to another event). No flickering due to a change in current occurs in the case of the sum of the first term and the second term being 25 ms or less, or the switching between the first term and the second term being carried out at 40 Hz or more.

Experimental examples of the lighting apparatus for a high-pressure discharge lamp of the present invention are described. High-pressure discharge lamps 1 to 34 of a rated power consumption of 180 W were fabricated based on the principal configuration shown in FIG. 1. Each lamp was lighted with a power supply unit under the following variable parameters (a) to (i) to observe flickering (and deformation of the shape of the electrode tip) and blackening of the arc tube:

(a) rated frequency (fundamental frequency in the stationary power lighting mode) [Hz],
(b) the number of rectangular waves of half-cycle period (τ0) of a high-frequency current intercalated into the first term (τ1),
(c) the number of rectangular waves of half-cycle period (τ0) of a high-frequency current of the first term intercalated into the second term (τ2),
(d) current value (I1a) [A] at the electrode (20a) as the anode in the first term (τ1),
(e) current value (Iba) [A] at the electrode (20b) as the cathode in the first term (τ1),
(f) disproportionate ratio (I1a/I1b*100) [%], (g) current value (I2) [A] at the electrode (20b) as the anode in the second term (τ2),
(h) intercalation interval (τK(=τ1+τ2)) [ms], and
(i) ratio ΔSa/ΔSb.

Among the parameters, ΔSa [A·ms] represents power disproportionately applied to the first electrode (20a) and ΔSb represents power disproportionately applied to the second electrode (20b).

FIG. 8 shows the results. As shown in FIG. 8, a combination of supply of disproportionate current to the first electrode in the first term (τ1) and supply of a current lower than the current supplied to the first electrode in the first term (τ1) to the second electrode during a predetermined time in the second term achieves reduced flickering of the high-pressure discharge lamps and reduced blackening in the luminescent portion. The service life of the high-pressure discharge lamp of the lighting apparatus can thereby be prolonged. The rated frequency of the high-pressure discharge lamps was 740 Hz throughout the experiments. Any other specification is also available in the present invention.

Figure 9:
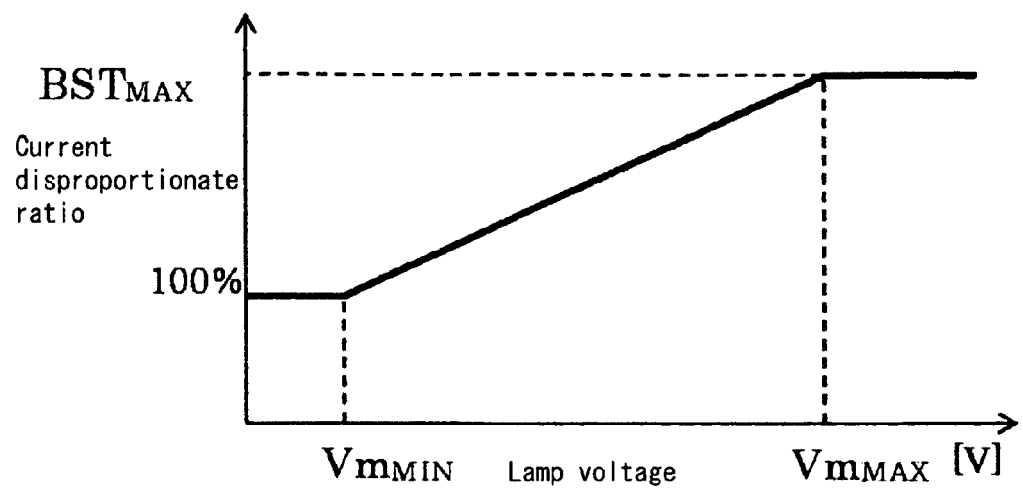
FIG. 9 is a graph schematically illustrating the relation between the lamp voltage and the disproportionate ratio of a lighting apparatus for a high-pressure discharge lamp in accordance with an embodiment of the present invention.
Figure 10:
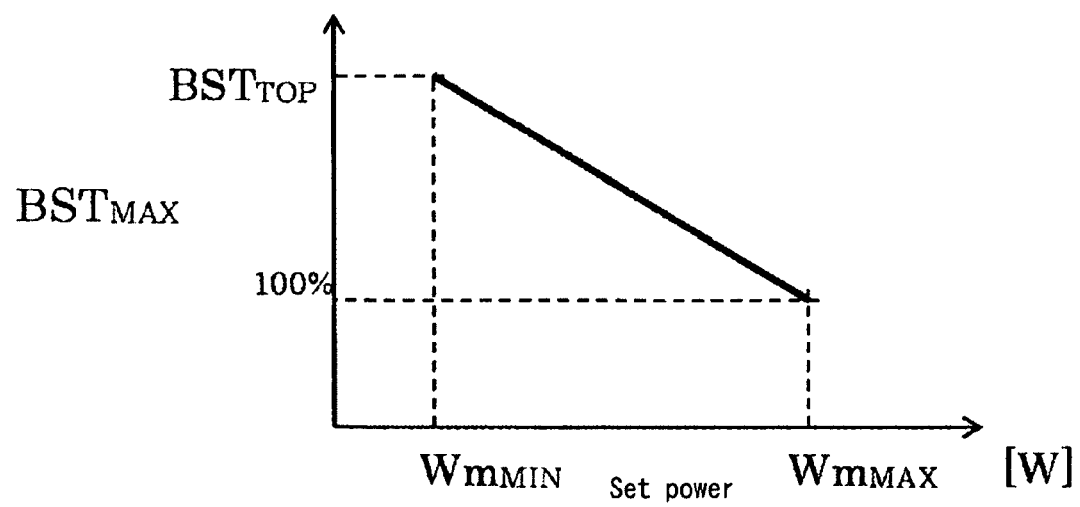
FIG. 10 is a graph schematically illustrating the relation between the lamp set power and the disproportionate ratio of a lighting apparatus for a high-pressure discharge lamp in accordance with an embodiment of the present invention.
Figure 11:
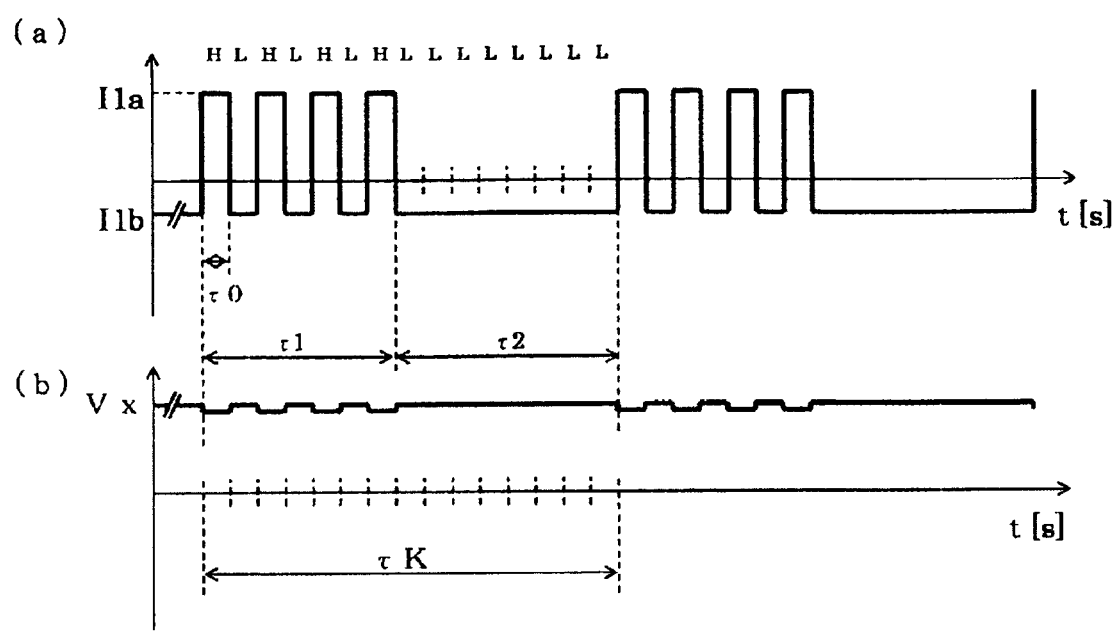
FIG. 11 is a simplified timing chart illustrating waveforms of current and voltage applied to a high-pressure discharge lamp of a lighting apparatus in accordance with an embodiment of the present invention.

With reference to FIGS. 9 to 11, examples of the disproportionate ratio I1a/I1b are described. FIG. 9 shows simplified relation between the lamp voltage and the disproportionate ratio according to an embodiment of the discharge lamp lighting apparatus of the present invention, where the longitudinal axis represents the disproportionate ratio I1a/I1b of currents flowing into the discharge lamp and the lateral axis represents the voltage applied to the discharge lamp. Since the power supply to the high-pressure discharge lamp is generally feedback-controlled to maintain the power at a certain level, a large amount of current flows in the case of a significantly low lamp voltage. At a high lamp current, the electrodes of the high-pressure discharge lamp can be sufficiently heated, so that a stable broad arc is generated at the attachment portion, which is not in the spot mode operation described above. Since flickering does not occur during such a stable arc discharge state, no function is required for current disproportionation. In contrast, at a high lamp voltage, the lamp current decreases. This increases a risk of the shift of the arc starting point and thus flickering. Such a phenomenon is outstanding during discharge of the high-pressure discharge lamp at a power of about 50%. Since the probability of flickering increases with a decrease in lamp current or increase in lamp voltage, it is preferred the current disproportionate ratio is increased with an increase in the lamp voltage.

In FIG. 9, the lower limit of current disproportionate ratio is 100%; however, the current disproportionate ratio is set to a minimum value that does not generate flickering. Similarly, with respect to the lamp voltage (VmMIN) causing a 100% current disproportionate ratio, the minimum current disproportionate rate is determined not to generate flickering. In the drawing, the current disproportionate ratio has an upper limit (BSTMAX) to prevent the current disproportionate ratio from having an excess value. The setting of the upper limit enables the maximum current disproportionate ratio to be controlled in response to the set power supplied to the discharge lamp. Although FIG. 9 shows the relation between the lamp voltage and the current disproportionate ratio, the relation can be interpreted as the mean current value and the current disproportionate ratio. In such a case, the mean current of the lamp decreases toward the right of the lateral axis in the drawing.

FIG. 10 shows simplified relation between the lamp set power and the current disproportionate rate according to an embodiment of the discharge lamp lighting apparatus of the present invention, where the longitudinal axis represents the upper limit (BSTMAX) of the current disproportionate ratio is FIG. 9 and the lateral axis represents electric power set to the high-pressure discharge lamp. As electrical power to the high-pressure discharge lamp increases, the lamp current increases. Since the lamp current increases with power supplied to the high-pressure discharge lamp, the electrodes of the high-pressure discharge lamp can be sufficiently heated. Thus, at the attachment of the arc, a stable broad arc is ensured from the spot mode operation described above, for the following reason. Flickering does not occur in the high-pressure discharge lamp at the rated power or dimmed power of 80% level even if the current disproportionate ratio is 100%. The power (WmMAX) in the drawing determines an optimum power not causing flickering even if the upper limit (BSTMAX) of the current disproportionate ratio is 100%. With reference to FIG. 9 again, in the case where the upper limit (BSTMAX) of the current disproportionate ratio is 100%, current disproportionation is not performed regardless of the lamp voltage.

Supposing that the lamp voltage does not significantly change in the case of a small set power value, the lamp current decreases, so that flickering occurs due to an increased risk of the shift of the starting point. The probability of flickering increases as the lamp current or lamp power decreases. Thus, preferably, the upper limit (BSTMAX) of the current disproportionate ratio is increased with the increase in the lamp voltage to reduce flickering. With reference to FIG. 9 again, since the upper limit (BSTMAX) of the current disproportionate ratio is determined by the set power, the disproportionate ratio increases as the set power value is decreased for the same lamp voltage. In other words, in this control, the disproportionate ratio increases as the lamp current decreases. Accordingly, the upper limit (BSTTOP) of the current disproportionate ratio at the minimum power (WmMIN) can be determined depending on the properties of the lamp and the set power.

FIG. 11 is a simplified timing chart of an embodiment of the current waveform and the voltage waveform applied to the discharge lamp of the present invention. In FIG. 11(a), the longitudinal axis represents the current waveform to the high-pressure discharge lamp and the lateral axis represents time, and in FIG. 11(b), the longitudinal axis represents the voltage waveform to the high-pressure discharge lamp and the lateral axis represents time. With reference to FIG. 11, a process for determination of the current waveform and the current values (I1a and I1b) to be applied to the discharge lamp is explained. The current values (I1a and I1b) to be applied to the respective electrodes (20a and 20b) can be readily determined by a microcomputer or Digital Signal Processor (DSP) mounted in the lighting power source unit. The concept of the processing is described.

The current waveform of the lamp shown in FIG. 11 has a term (τK) that is a set of a high-frequency waveform formed during the first term (τ1) and a low-frequency waveform formed during the second term (τ2), and has four disproportionate zones (H) and eleven nondisproportionate zones (L) in one set.

In the power control of the high-pressure discharge lamp, a lamp voltage is acquired and then is divided by another lamp voltage acquired from a predetermined power value to calculate a target current value, and the lamp current is controlled to be equal to the target value. At this point, the target lamp current is a mean lamp current. Since the lamp current is disproportionate in this embodiment, the target lamp current value must be independently determined for the individual zones (H and L), as described in further detail below.

The process for acquisition of the lamp voltage is described. As shown in FIG. 11, the lamp voltage is different between the current-disproportionate zones and the current-nondisproportionate zones. Since the lamp voltage of the discharge lamp decreases in the short term with the increase in the lamp current, the timing for acquisition of the lamp voltage for determination of the target lamp current is important in this embodiment. It is therefore preferable to acquire a mean voltage. As described above, the lamp current waveform in the drawing has a term (τK) including one set of high-frequency components and low-frequency components. Thus, it is preferable to acquire the mean value of the lamp voltage over the entire one set of term (τK). In the drawing, the mean lamp voltage can be determined by accumulating the lamp voltage value for every term (τ0) and dividing the accumulated value by 15 being the sum of the terms (τ0) within one set. Using the result, the latest mean lamp voltage may be determined by a moving-average method. The mean value of the lamp voltage of the entire term (τK) within one set can be thereby acquired.

Next, the target lamp current value can be determined from the set power value divided by the mean lamp voltage. Since the target current value is a mean value at this moment, the target current of the lamp current value ($I1a$) of the disproportionate region (H) and that of the lamp current value ($I1b$) of the nondisproportionate region (L) must be individually calculated. The upper limit (BSTMAX) of the disproportionate ratio is determined from the set lamp power value as is explained with reference to FIG. 10, and the current optimum disproportionate ratio is selected from the acquired mean voltage information as is explained with reference to FIG. 9. This calculation may be performed using an equation, or may be selected from a table using a microcomputer or DSP.

In this embodiment, the target currents of the lamp current ($I1a$) and the lamp current ($I1b$) can be calculated from equations (1) and (2):

$$\text{Mean target current value} = \{I1a \times H \times 4 + I1b \times L \times 11\}/15 \quad (1)$$

$$I1a = I1b \times (\text{disproportionate ratio}) \quad (2)$$

At a significantly small lamp voltage, the mean target current value is large. As a result, a significantly large current ($I1a$) is calculated for the disproportionate region (H) and may exceed the allowable maximum current that is determined by the circuit of the lighting power unit. In such a case, the current value ($I1a$) is set to the allowable maximum current, and the current value ($I1b$) can be recalculated from equations (1) and (2). The lamp current value can be limited by equation (3):

$$\text{Mean target current value}\{(\text{maximum current}) \times H \times 4 + I1b \times L \times 11\}/15 \quad (3)$$

Equation (3) is effective for protection of the lighting power unit.

The process for determination of the current values ($I1a$ and $I1b$) by the disproportionate current has been explained. Addition of control of the disproportionate ratio can enhances the advantageous effects of the present invention by the synergy effect.

The lighting process for recovery of the electrode shape is described. This embodiment explains recovery of the tip shape of the electrode by an increase in power. Throughout the specification, the power supplied to recover the tip shape of the electrode is referred to as "electrode recovering power." The electrode recovering power is greater than the set power in the modulated power lighting mode, and is power that can heat the electrode tip to a temperature range enabling the tip to be recovered or that is supplied based on the lighting waveform enabling the tip to be recovered. Thus, the electrode recovering power may have any value relative to the power during the modulated power lighting mode or may have any absolute value. FIG. 12 illustrates a simplified electrode of the high-pressure discharge lamp in accordance with an embodiment of the present invention. FIG. 12A illustrates an initial stage of the electrode of the discharge lamp. FIG. 12($b$) schematically illustrates a next stage in which a current waveform according to the modulated power lighting mode of the present invention having 50% power of the rated power and a disproportionate rate of about 300% is continuously applied to the discharge lamp, in the stage shown in FIG. 12($a$). In this embodiment, the shape of the electrode (E1) functioning as an anode and receiving disproportionate current shown in FIG. 11 varied into a dish shape. The electrode is not deformed for a short time, for example, several seconds to several tens of seconds, but is gradually deformed into a dish shape after such a waveform is applied for several minutes. Of course, the shape depends on the current ($I1a$) value in the current-disproportionate phase and the frequency and repetition of disproportionation of each waveform. Since the tip temperature of the electrode (E1) working as an anode increases, a large current value ($I1a$) facilitates evaporation of tungsten due to further temperature rise at the tip of the electrode (E1). The tungsten vapor is dissociated into tungsten ions in the discharge arc, and is deposited onto the electrode tip (W1) and the circumference of the electrode tip (W1) during the cathode mode.

In the case where the discharge lamp is driven at about 50% power of the rated power and about 300% of disproportionate rate in the current waveform of the present invention, the temperature of the electrode (E1) during the cathode operation undergoing disproportionate action is higher than the temperature of the electrode (E2) during the cathode operation. Accordingly, a larger amount of tungsten is supplied to the gas phase from the electrode (E1) than the electrode (E2). Since the time functioning as a cathode is longer in the electrode (E1) than the electrode (E2), tungsten in the gas phase is primarily deposited on the electrode (E1) and forms a smaller protrusion (W1) on the original protrusion. Thus, a halogen cycle involving evaporation and deposition of tungsten occurs on the electrode (E1). The formation of the smaller protrusion functions as the center of an arc attachment and can avoid the shift of the arc spot. As a result, application of the optimized current waveform of the present invention is effective for development of the advantageous effects of the present invention, that is, felicitated propagation of the protrusion of the electrode and further stabilization of the arc discharge, without shift of the arc spot. Although the dish-shaped protrusion is intentionally enlarged in the drawing, it is preferred the disproportionate current value ($I1a$), and the frequency and the repetition of disproportionation of each waveform is optimized to prevent extraordinary propagation of the protrusion. An excess volume of dish protrusion precludes stabilization of the arc spot regardless of the smaller protrusion.

On the other hand, in the case of use of the waveform of the present invention at the electrode (E2), the time of the anode operation is longer than the cathode operation. This basically causes the surface of the electrode (E2) to be roughened by thermal electrons emitted from the electrode (E1). The operation of each electrode in the state shown in FIG. 12($b$) has been explained. Throughout the explanation, it is understood that application of asymmetric current waveforms in the discharge lamp leads to asymmetric states of the electrodes (E1 and E2).

FIG. 12($c$) illustrates the state of the electrodes after a symmetric waveform of about 370 Hz at an about 80% of the rated power is applied for several seconds to the discharge lamp at the state of FIG. 12(*b*). Experimental results revealed that the state of the asymmetric electrodes was almost recovered to the initial state. In calculation, the heat at the 80% level is less than the heat quantity required for formation of the entire electrode tip, for example, the tungsten mass (W3) by melting. In practice, however, the length (D1') of the tip after melting is longer than the length (D1) of the protrusion in FIG. 12(*a*), demonstrating growth of the protrusion. This indicates a decrease in distance between the counter electrodes and thus a decrease in voltage of the discharge lamp. These facts were confirmed by experimental results. As the lamp voltage decreases, the lamp current increases, resulting in a decreased disproportionate rate and stabilized arc. Use of the waveform according to the present invention facilitates growth of the protrusion to further reduce the voltage and stabilize the arc. FIG. 12(*d*) illustrates a state of the electrodes after input of the repeated power in the state shown in FIG. 12(*c*). The experiment confirmed that the deposited tungsten mass (W3) was melted and absorbed into the tip (W4).

The explanation with reference to FIG. 12 demonstrates that supply of electric power for several seconds to the discharge lamp can recover the asymmetric shape of tips of the electrodes (E1 and E2) to the original shape.

FIG. 13 is a simplified timing chart of a current waveform and the voltage waveform to the discharge lamp according to an embodiment of the present invention. With reference to this chart, an embodiment is explained that involves the recovery of the electrode tips by supply of the power for several seconds to the discharge lamp. As described above, application of a symmetric waveform of about 370 Hz and about 80% of the rated power for several seconds can recovers the shape of the electrodes. Thus, for example, regular intercalation of enhanced power supply during the supply of 50% of the rated power is proposed.

In the case where the high-pressure discharge lamp of the present invention is used in a projector, it is important to increase the power moderately so that a change in the image quality is not sensed. In this embodiment, the power is changed about 50% to 80% for a term ($\tau$h).

Also, as is illustrated with reference to FIG. 10, the power current disproportionate rate can be reduced by increasing the electric power. Thus, during the term ($\tau$h) in FIG. 13, the current is moderately increased while the current disproportionate ratio is moderately decreased in an attempt. In addition, in order to recover the shape of the electrode, about 80% power must be supplied within the term ($\tau$j), and the interval (ti) must be determined such that the electrode is recovered before it is deformed into an excessively irregular shape. In an embodiment of the observed waveform shown in FIG. 13, numerical parameters are set as follows:

Lamp: high-pressure mercury lamp (rated power 180 W)
Power during electrode recovery: 80% rated power
Power in stationary mode: 50% rated power
Term ($\tau$i): 600 seconds
Term ($\tau$j): 50 seconds
Term ($\tau$h and $\tau$h'): 3 seconds The mean power supplied to the discharge lamp calculated from these parameters are about 52.3%. For example, for the purpose of operation at 50% power, about 2 to 3% power is required for the recovery of the electrode. On the contrary, if the electrode is recovered at 100% power, the brightness suddenly changes and the mean power consumption undesirably increases. Since energy saving is a priority issue, the power for electrode recovery is preferably low to a maximum extent.

During use of the discharge lamp for a long term, the arc tube of the discharge lamp loses its transparency due to blackening. Such a phenomenon occurs by deposition of tungsten from the gas phase onto the inner wall of the arc tube of the discharge lamp. If a low power less than about 60% of the rated power is supplied to the discharge lamp, the inner wall of the arc tube is not sufficiently heated and the gaseous tungsten is readily deposited on the inner wall of the arc tube. Supply of a high power to the discharge lamp after tungsten is deposited, however, heats the inner wall of the arc tube, so that the deposited tungsten can be re-evaporated. As shown in FIG. 13, regular supply of a power more than 50% results in not only recovery of the shape of the electrode, but also maintenance of transparency of the discharge lamp due to reduced deposition of tungsten. In this embodiment, 50% lighting is explained. In stead, the electrode can be recovered by control that involves switching to a second power higher than an arbitrarily set modulated power lighting mode.

Figure 14A:
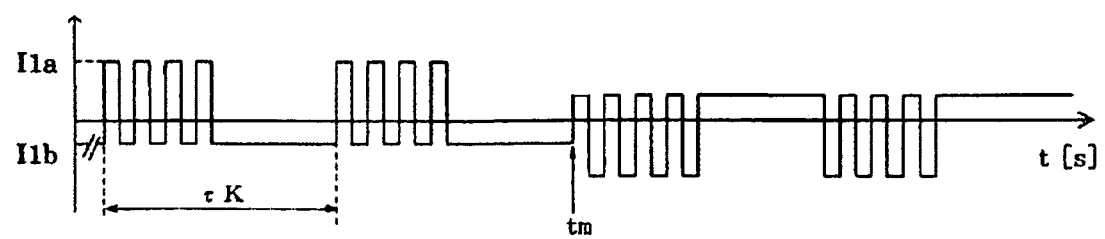
FIGS. 14A and 14B each includes a timing chart of a current waveform supplied to a high-pressure discharge lamp of a lighting apparatus in accordance with an embodiment of the present invention and an outline view of electrodes of the high-pressure discharge lamp.
Figure 14B:
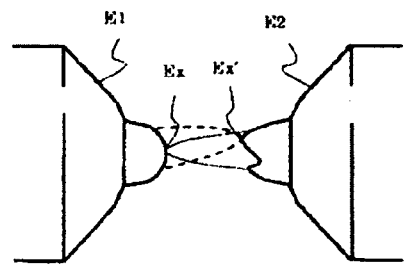

FIG. 14(*a*) is a simplified timing chart of a waveform applied to the high-pressure discharge lamp according to an embodiment, and FIG. 14(*b*) is a schematic view of the electrodes of the high-pressure discharge lamp. As is described with reference to FIG. 12(*b*), the asymmetric electrode shape is caused by asymmetric current waveforms. A possible solution for such a problem is reversal of asymmetric polarity. This can reduce disproportionation between the electrodes (E1 and E2). In FIG. 14(*a*), the polarity of the asymmetric current waveform is reversed at the time (tm). Such a reversal operation may be performed every several seconds or several minutes.

In view of the stability of the arc, the spot of the arc may be shifted within an extremely short time from the reversal time (tm). This phenomenon is further explained with reference to FIG. 14(*b*). In the drawing, the tip of the electrode (E2) is deformed for explanation. The arc spot before the polarity reversal of the asymmetric waveform to the discharge lamp is present at a starting point (Ex), for the following explanation. After the polarity reversal of the asymmetric waveform, the arc spot is shifted to another starting point (Ex'). The arc spot occurs at a position from which thermal electrons are emitted most significantly, in other words, at a position of the highest temperature or the shortest distance from the counter electrode. Since the position of the spot of the electrode (E1) is fixed, the position forming the arc varies every polarity reversion of asymmetric waveform, as shown in the drawing.

In the case of the use of the high-pressure discharge lamp of the present invention in a projector, the alternate shift of the arc spot between the two electrodes must be controlled not to affect the image quality adversely. In this embodiment, flickering can be limited to an extremely short term, even if it occurs. Such a problem can be solved as follows: As is explained with reference to FIG. 13, the power supplied to the discharge lamp is increased to a predetermined value to recover the electrode shape and to switch the attachment of the discharge lamp from the spot mode to the diffused mode. The solution is found by reversal of the asymmetric polarity. The solution will be described later in further detail.

The next explanation relates to a key point on the shift from the modulated power lighting mode to the stationary power lighting mode by an increase in power. In general, the electrodes used in a high-pressure discharge lamp are primarily composed of tungsten having an extremely high purity of 99.999% for the purpose of improved long-term illumination intensity. Although high-purity tungsten contributes to a prolonged service life, it is fragile due to coarsened crystal grains. In particular, crystal grains are readily coarsened at the tips, which are heated to extremely high temperature: Sudden thermal stress applied to the crystal grains causes cracking in crystal grain boundaries. A countermeasure must be taken to reduce the disproportionate ratio moderately with an increase in the set power.

Figure 15:
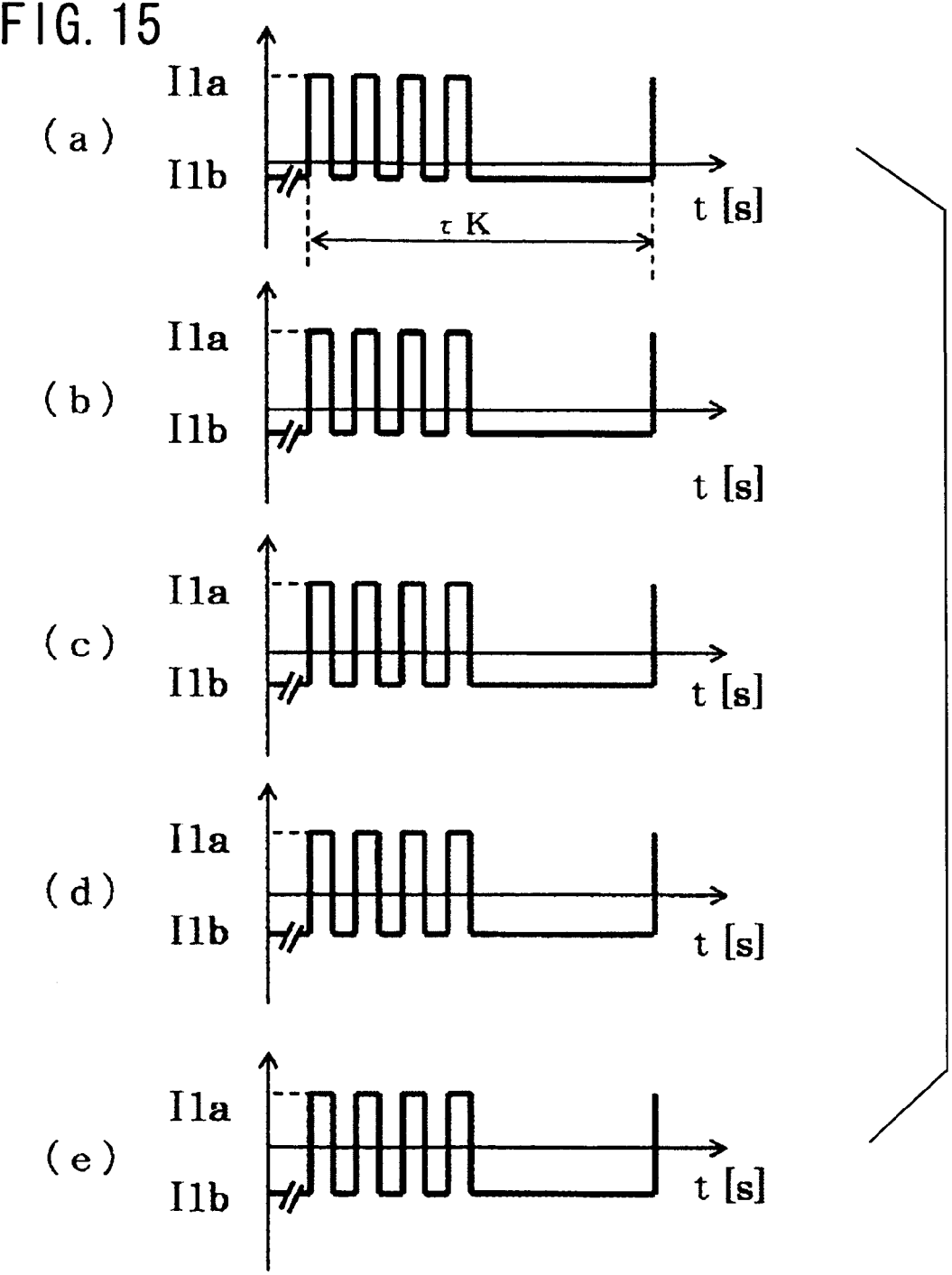
FIG. 15 is a simplified timing chart of a current waveform supplied to a high-pressure discharge lamp of a lighting apparatus in accordance with an embodiment of the present invention.

FIG. 15 is a simplified timing chart of a current waveform applied to the discharge lamp according to an embodiment of the present invention. FIGS. 15(a) to 15(e) illustrates a change in the current waveform applied to the discharge lamp in the process increasing the set power to recovery the electrodes. As is explained with reference to FIG. 13, the power must be moderately changed to recover the shape of the electrodes. For example, FIG. 15(a) is a current waveform at 50% power while FIG. 15(e) is a current waveform at 70% power. In the embodiment shown in FIG. 15, the disproportionate ratio moderately decreases with an increased set power and is 100% at the time shown in FIG. 15(e). As is explained with reference to FIG. 9, the upper limit (BST-MAX) of the current disproportionate ratio is determined by the set power. Thus, the disproportionate ratio increases as the set power decreases, at the same lamp voltage. As a result, use of the lamp current waveform of the present invention can maintain stable arc discharge with reduced flickering even at a disproportionate ratio of 100% and a supplied power of about 70%~80%.

It is appreciated that the waveform changes from FIG. 15(e) to FIG. 15(a) in the case where the power is moderately decreased. In the process varying the set power value, the frequency in the zones (τ1 and τ2) or the zone (τ1) corresponding to the set power value(s) can be changed to an optimum value within the present invention. At a power value of 80% or more, since the attachment of the discharge lamp varies from the spot mode to the diffuse mode, a conventional symmetric waveform, for example, rectangular waves of 50 Hz to 1000 Hz can be supplied.

FIG. 15 depicts a change in the operation waveform in the increased power. If the recovery of the electrodes is not necessary, the disproportionate ratio may be gradually decreased at a constant power, for example, 50% power. The polarity of the asymmetric waveform may be reversed at a reduced disproportionate ratio, as follows.

Figure 16:
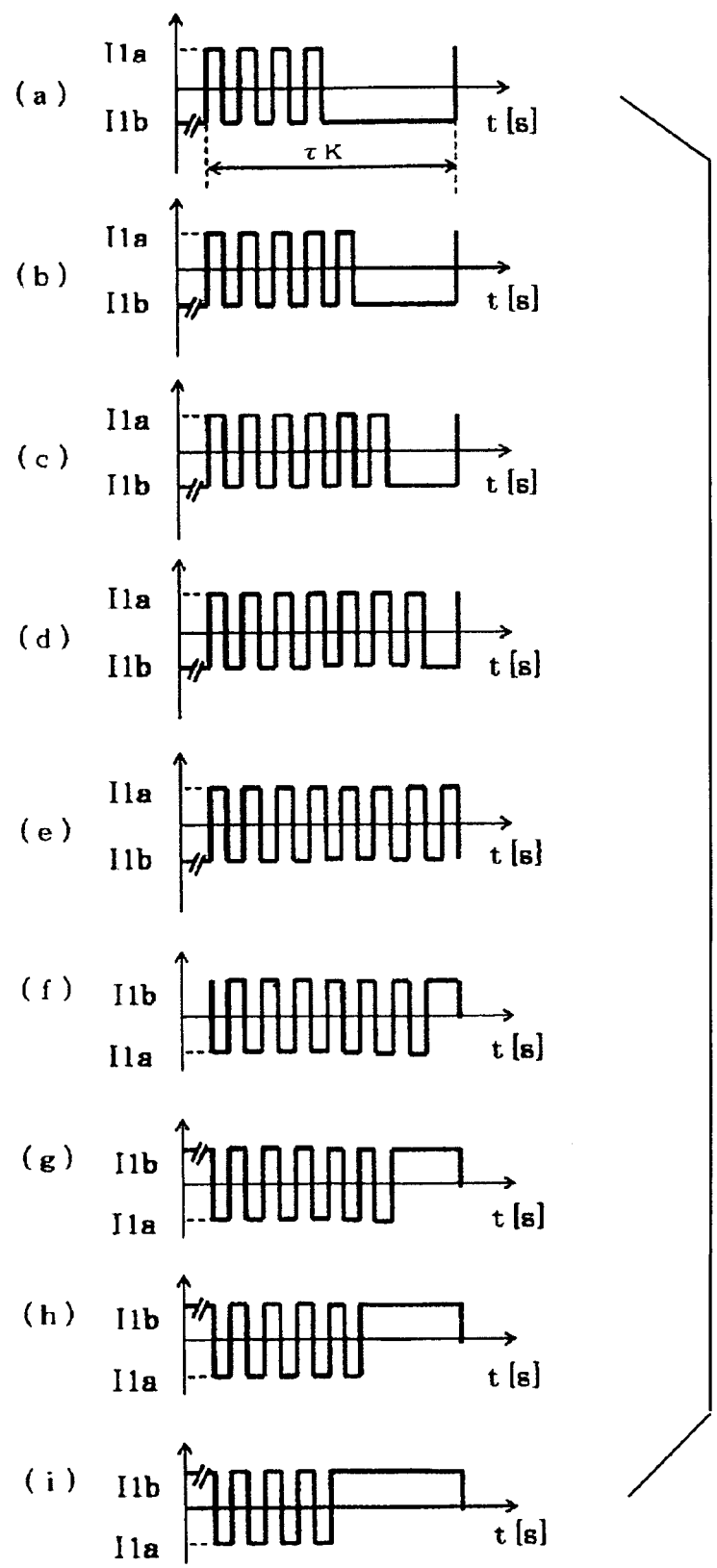
FIG. 16 is a simplified timing chart of a current waveform supplied to a high-pressure discharge lamp of a lighting apparatus in accordance with an embodiment of the present invention.

With reference to FIG. 16, exemplary waveforms during polarity reversal are explained. FIG. 16 is a simplified timing chart of a current waveform applied to the discharge lamp in accordance with the present invention. In the drawing, the waveform is varied from FIG. 16(a) to FIG. 16(i) at a predetermined time for polarization reversal of an asymmetric waveform. In the drawings, the power is increased to about 70%, the current disproportionate ratio is 100%, and the polarity of the asymmetric waveform is gradually reversed. Use of a lamp current wavelength of the modulated power lighting mode having the first term (τ1) and the second term (τ2) of the present invention ensures stable arc discharge with reduced flickering and the recovery of the shape of the electrodes, even at a disproportionate ratio of 100% and a power of about 70%. In addition, the arc attachment of the discharge lamp varies from the spot mode to the diffuse mode; thus, the asymmetric waveform can be reversed independent of the shift of the starting point. In other words, the shape of the electrodes can be recovered while the polarity of the asymmetric waveform can be reversed at a power level closest to 50% to a maximum extent. In such an operation, the state shown in FIG. 16(a) is maintained for several seconds, then is changed to the state shown in FIG. 16(i) by spending several seconds, and is maintained at the state in FIG. 16(i) for several seconds. The purpose of maintaining the waveforms shown in FIGS. 16(a) and 16(i) is as follows: If the currents (I1a and I1b) are identical, only one electrode functions as an anode for a longer time due to an asymmetric waveform and heat is concentrated to the first electrode, and the electrode can be melted to be recovered. Accordingly, the state shown in FIG. 16(a) or 16(i) is maintained for a several seconds to achieve the recovery of the electrode and polarity reversal of the asymmetric waveform at a power of about 70%.

In the explanation with reference to FIG. 13, the shape of the electrodes is recovered by a symmetric current of 80% power. It is confirmed that even 70% power has the same recovery effect as that of 80% power by the use of the waveform of the present invention. Such a decrease in power to 70% also reduces the mean power consumption. More preferably, the shape of the electrode is recovered at about 50% power. Alternatively, the polarity of the asymmetric waveform may be reversed as shown in FIG. 16 before the shape of the electrodes is deformed.

Figure 17:
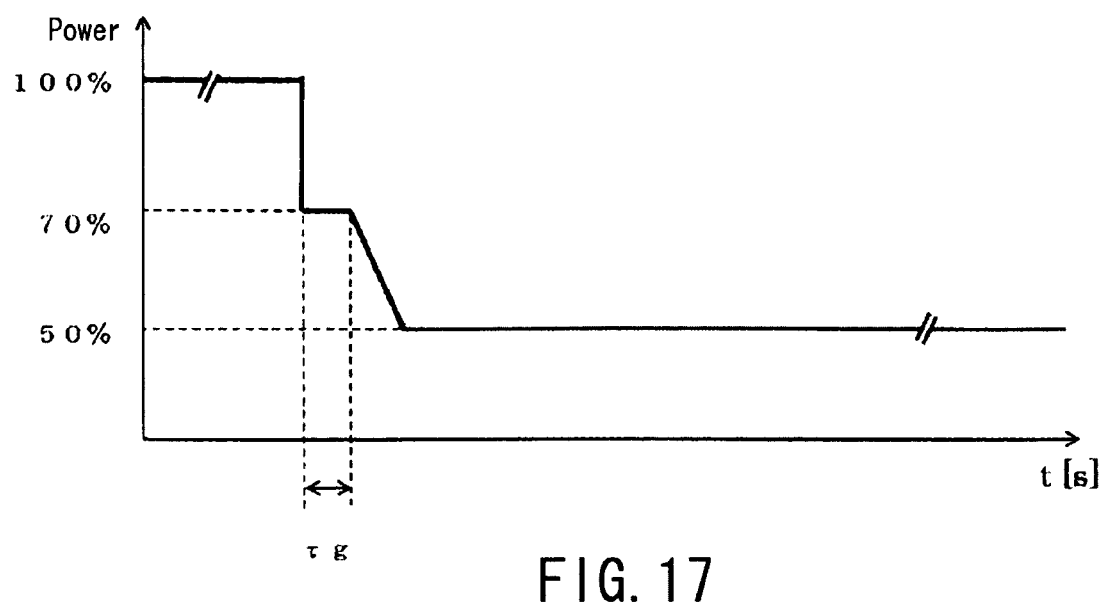
FIG. 17 is a simplified timing chart of a current waveform supplied to a high-pressure discharge lamp of a lighting apparatus in accordance with an embodiment of the present invention.

Next, an embodiment of power during the shift from the stationary power lighting mode to the modulated power lighting mode is explained. FIG. 17 is a simplified timing chart in which the power of the high-pressure discharge lamp is decreased from 100% to 50%. At the rated power state, the electrode tip tends to be rounded. For example, in the operation at about 80% power, as is explained with reference to FIG. 12(c), only a small portion of the electrode tip is melted to form a protrusion at the tip. This embodiment utilizes such a phenomenon. FIG. 17 illustrates an embodiment involving a power reduction from the rated power to 50% power. The power reduction is not carried out directly from the rated power to the 50% power, but via an intermediate term (tg) of, for example, 80% or 70% power, as described above, to target 50% power.

Such a power control having an intermediate power (second power) that is lower than the power during the stationary power lighting mode and is higher than the power during the modulated power lighting mode causes formation of a sharp electrode tip that can reduces the range of the shift of the starting point. This ensures a further reduction in flickering immediately after the reduction to 50% power.

In the explanation of the embodiments described above, the second power (intermediate power) between the two lighting modes is explained by actual figures, such as 50%, 70%, and 80%, but the figure can be optimized based on the experiments or calculation on a lamp used.

The recovery of the electrodes by appropriate polarity reversal in the modulated power lighting mode is explained in the embodiment described above. Since the shape of the electrodes after the recovery somewhat differs from that before the recovery, preferably, the load to the electrodes is appropriately adjusted at the start and end of the recovery and during the recovery, depending on the state of the electrodes. In the case of significant deformation of the shape that requires meaningful recovery, preferably, lighting is carried out using a waveform having high thermal load to the electrode, and then using a waveform suitable for shaping of the electrode under a minimized thermal load after the recovery of the shape. If such significant recovery of the electrode is expected, at least two lighting waveforms electrode are used in combination based on the lighting state (lighting history) of the lamp in order to recovery the shape of the electrode into an intended shape more precisely.

An embodiment and its advantages in the case of driving by two or more selected waveforms in the modulated power lighting mode are explained. FIG. 18 is a schematic illustration of the state of the electrode tips during lighting in a combination of different current waveforms. If the tip of the electrode is deviate from the axis center of the electrode, like a second protrusion 22a' at the electrode tip shown in FIG. 18(a), the cycle of the polarity reversal of the lighting waveform is increased. The melting zone of the electrode tip can thereby be shifted to the axis center, like a secondary protrusion 22a-1 shown in FIG. 18(*c*), for the following possible reasons. In a phase in which the electrode functions as an anode, thermal energy generated by collision of electrons with the electrode can diffuse toward a broad area and facilitates uniform melting or evaporation over a wide area of the electrode surface. Furthermore, evaporated tungsten, which is the electrode material, is ionized in arc plasma, is attracted to the arc attachment point or its vicinity, and is deposited threat to form a part of the protrusion at the tip. The deposited range is limited depending on the cycle of the polarity reversal of the lighting waveform. During the deposition, if the tip of the electrode is irregularly deformed and is deviated from the axis center of the electrode like a secondary protrusion 22a'-1 as shown in FIG. 18(*b*), the irregular deformation like a second protrusion 22a'-2 in FIG. 18(*b*) is undesirably encouraged. Accordingly, on the recovery and shaping of the electrode, a wide evaporation range is set to concentrate the melted mass to the axis center of the electrode like the secondary protrusion 22a-1 in FIG. 18(*c*), and then the range for deposition of tungsten is limited to propagate the protrusion at the electrode tip like a secondary protrusion 22a-2 shown in FIG. 18(*d*). The resulting protrusion less deviates from the electrode axis and is substantially recovered into the original shape. Continuous or periodical repetition of this process at an appropriate distribution contributes to maintenance of the shape of the electrode for a long term.

With reference to FIG. 11, a technique of switching of the waveform while the disproportionate current value is maintained in the present invention is explained. As is illustrated with reference to FIG. 11, the lamp current waveform consists of a unit term ($\tau K$) including a high frequency generated during a first term ($\tau 1$) and a low frequency generated during a second term ($\tau 2$), these includes disproportionate zones (H) and nondisproportionate zones (L). In the present invention, preferably, the waveform is switched under the same ratio of the total term ($\tau I1a$) of the disproportionate zones (H) to the total term ($\tau I1b$) of the nondisproportionate zones (L).

As described above, in the control using a microcomputer or DSP, a lamp voltage is acquired and is divided by another lamp voltage acquired from a predetermined power to calculate a target lamp current value and to calculate the disproportionate current value (I1a) and the nondisproportionate current value (I1b). Since the lamp voltage varies every second, this calculation must be always calculated. In the modulated power lighting mode, switching of the waveform requires recalculation even under a constant power supply to the high-pressure discharge lamp. Since calculation immediately after the switching of the waveform is too late for reflection to the actual waveform, the calculation should be preliminarily completed. This implies simultaneous parallel processing on calculation for the subject current waveform and calculation for the next current waveform, resulting in significantly heavy processing load. A candidate measure is switching of the disproportionate current value (I1a) and the nondisproportionate current value (I1b) based on the preliminarily performed calculation, immediately after the change of the waveform. According to the verification by the inventors, such a measure is inevitably followed by flickering and the shift of the luminescent spot. Such flickering probably occurs by a localized change in the temperature of the electrode tip due to a change in current. The attained temperature at the electrode tip significantly varies with a change in the disproportionate current (I1a), that is, a change in wave height even if the waveform is switched under a constant power. As a result, a small protrusion may instantaneously melt, or the thermal point of the starting point may vary. If the disproportionate current (I1a) is increased, the power instantaneously increases because the mean voltage of the high-pressure discharge lamp does not significantly vary at the moment. As a result, brightness instantaneously increases, which may be visually observed. Such a variation in brightness is not desirable for imaging apparatuses such as a projector.

Figure 19:
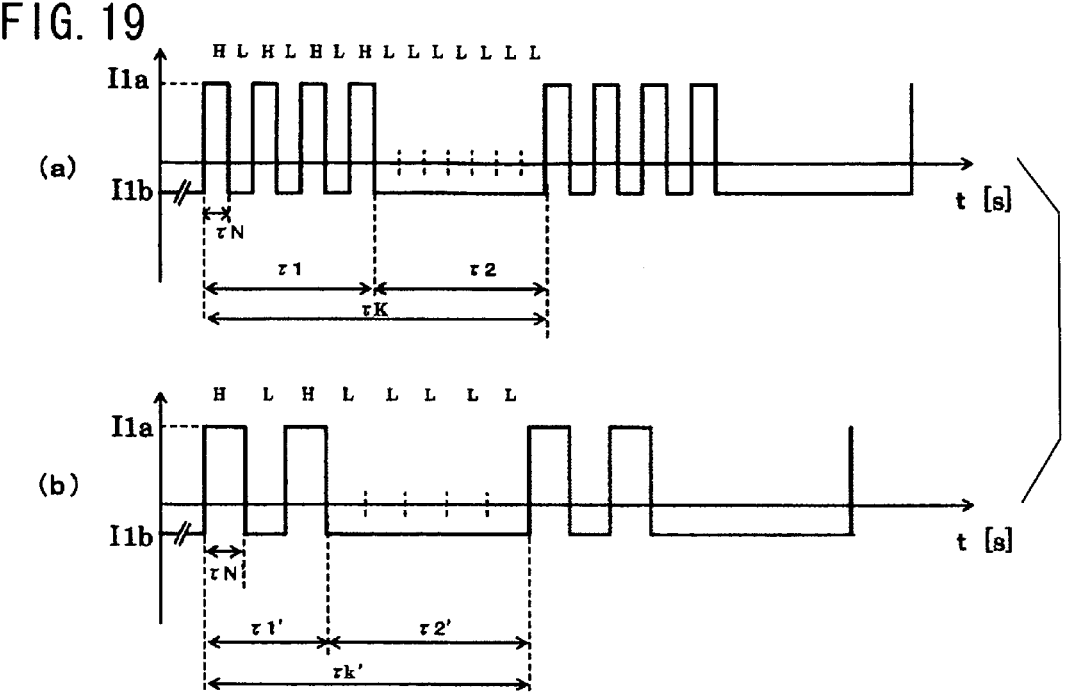
FIG. 19 is a simplified timing chart of two selected current waveforms applied to a high-pressure discharge lamp of a lighting apparatus in accordance with an embodiment of the present invention.

FIG. 19 is a simplified timing chart illustrating two waveforms applied to the high-pressure discharge lamp according to an embodiment of the present invention. FIGS. 19(*a*) and (*b*) illustrates two current waveforms that haven been preliminarily prepared. Each waveform consists of a cycle having a different term ($\tau K$) that includes a first term ($\tau 1$) and a second term ($\tau 2$). The number of disproportionate zones (H) is four and the number of nondisproportionate zones (L) is ten in the current waveform shown in FIG. 19(*a*), that is, H:L=4:10. The number of disproportionate zones (H) is two and the number of nondisproportionate zones (L) is five in the current waveform (b), that is, H:L=2:5, which is the same as 4:10. The current (I1a) and the current (K1b) are determined from equations (5) to (7):

$$\text{Mean target current value} = \{I1a \times \tau I1a + I1b \times \tau I1b\}/\tau K \quad (5)$$

$$I1a = I1b \times (\text{disproportionate ratio}) \quad (6)$$

$$\text{Mean target current value} = (\text{set power})/(\text{lamp current}) \quad (7)$$

where $\tau I1a$ represents the total term in the disproportionate zones (H) and $\tau I1b$ represents the total term in the nondisproportionate zones (L).

The results demonstrate that the current value (I1a) is identical to the current value (I1b), if the ratio of the total term ($\tau I1a$) to supply the current value (I1a) to one cycle ($\tau K$) is identical to the ratio of the total term ($\tau I1b$) to supply the current value (I1b) to one cycle ($\tau K$) under the same set power. Since the two current waves described above have the following ratio: H:L=4:10, the current value (I1a) is identical to the current value (I1b) in these current waves. Equation (5) demonstrates that the current value (I1a) differs from the current value (I1b) in the two waveforms if the ratio of the number of disproportionate zones (H) to the number of nondisproportionate zones (L) differs between the two waveforms.

Equalization of the ratio of the total terms ($\tau I1a$) to supply the current value (I1a) and equalization of the ratio of the total terms ($\tau I1b$) to supply the current value (I1b) can omit high-rate recalculation or simultaneous calculation for a next waveform to be selected. Switching of the waveform at the same current value (I1a and I1b) under the same supply power can reduce an instantaneous variation. For convenience of explanation, the disproportionate zones (H) and nondisproportionate zones (L) are an integer multiple of the unit term ($\tau N$) in the drawing. Instead, these may have any values as long as the time ratio is substantially the same as described above. In FIG. 19(*a*), the waveform including four disproportionate zones (H) and ten nondisproportionate zones (L) is compared with the waveform (*b*) including two disproportionate zones (H) and five nondisproportionate zones (L). Instead, if only the base term (TN), in other words, if only the frequency is varied without changes in the number of zones (H) and (L), the time ratio is the same. As described above, the calculation can be performed without synchronization with the timing of the switching and the calculated value can be used without further processing. Accordingly, the waveform can be switched while a change in optical output from the high-pressure discharge lamp can be minimized by a simple program.

One cycle term (τK), which is the sum of the first term (τ1) and the second term (τ2) is further explained. When the current waveform of the present invention is supplied to the high-pressure discharge lamp, light varies at the frequency of one cycle (τK), i.e., 1/τK. The visual sensitivity of humans to variable light depends on the frequency and the peak frequency is about 8 Hz to 10 Hz. Thus, 1/τK must be larger than the peak frequency. Since the image refresh rate of a liquid crystal panel mounted in a data projector is about 60 Hz, the frequency applied to the high-pressure discharge lamp must be selected not to interfere with the refresh rate. Preferably, 1/τK is set to a frequency at least about 25 Hz higher than 60 Hz, i.e., to 85 Hz or more.

The selection of the waveforms is explained in the case where two or more waveforms are selected for operation in the modulated power lighting mode. An important factor to prolong the service life of the lamp is maintenance of an appropriate distance between the electrodes of the lamp. A simple and effective way of determining the distance between the electrodes of the lamp is to detect the lamp voltage or current. The distance between the electrodes of the lamp highly correlates with the lamp voltage or current. In other words, the lamp voltage is the simplest and most effective factor to observe the distance between the electrodes of the lamp. In the case of a low lamp voltage, i.e., a short distance between the electrodes, it is preferred to select a waveform that enables the distance between the electrodes to increase and to raise the lamp voltage. On the contrary, in the case of a high lamp voltage, i.e., a long distance between the electrodes, it is preferred to select a waveform that enables the distance between the electrodes to decrease and the lamp voltage to be lowered. Accordingly, selection of the driving waveform based on the change in lamp voltage enables the lamp voltage (or the distance between the electrodes) to be maintained at any value.

Figure 20:
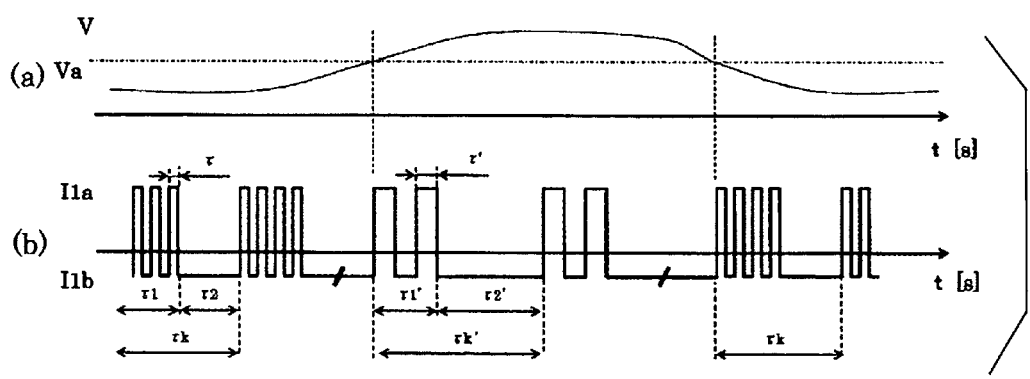
FIGS. 20(a) and 20(b) are timing charts of a voltage waveform and a current waveform, respectively, that are applied to a lighting apparatus for a high-pressure discharge lamp in accordance with another embodiment of the present invention.
Figure 21:
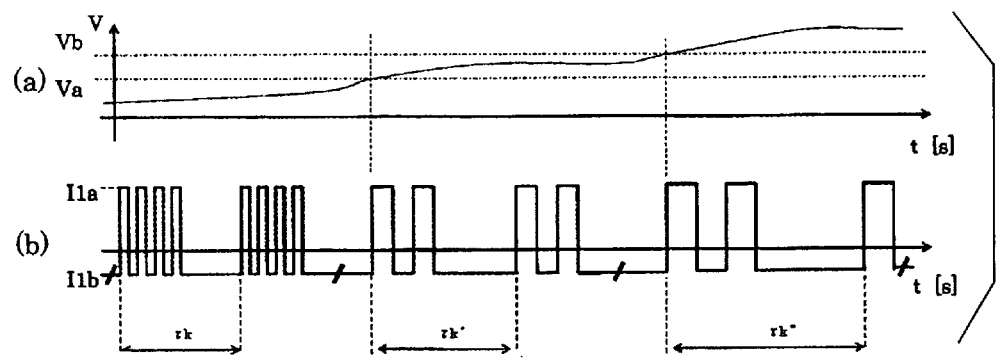
FIG. 21 is a timing chart of a voltage waveform and a current waveform, respectively, that are applied to a lighting apparatus for a high-pressure discharge lamp in accordance with another embodiment of the present invention.

FIGS. 20 and 21 show that two or three driving waveforms are selected depending on a change in lamp voltage. If the lamp voltage is low in FIG. 20(a), the waveform of the term τk in FIG. 20(b) is continuously selected until the lamp voltage reaches a desirable value Va. After the lamp voltage Va is attained, the waveform of the term τk' is continuously selected until the lamp voltage decreases again. After the voltage decreases to the value Va, the waveform of the term τk is selected again. If the lamp voltage does not decreases after the selection of the waveform represented by the term τk', in other words, if the lamp voltage increases as shown in FIG. 21(a), the waveform of the term τk" in FIG. 20(b) is selected again to drop the voltage. FIGS. 20(b) and 21(b) show a combination of two dissimilar waveforms. Instead, a combination of two similar waveforms also exhibits substantially the same effect. Such selection of waveforms enables the lamp voltage to be maintained at a desirable value. In other words, a desirable distance between the electrodes can be maintained, resulting in prolonged service life of the lamp. An example of this embodiment is shown. These parameters are based on the lighting conditions of the timing chart shown in FIG. 20.

Rated power of lamp: 180 W
τk: 10.8 ms
τk': 8.3 ms
Va: 80 V

Figure 22:
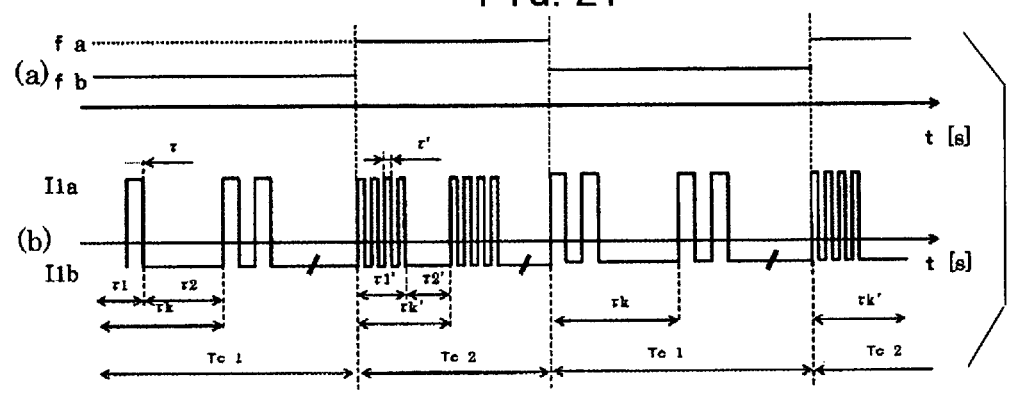
FIG. 22 is also a timing chart of a frequency waveform and a current waveform, respectively, that are applied to a lighting apparatus for a high-pressure discharge lamp in accordance with another embodiment of the present invention.
Figure 23:
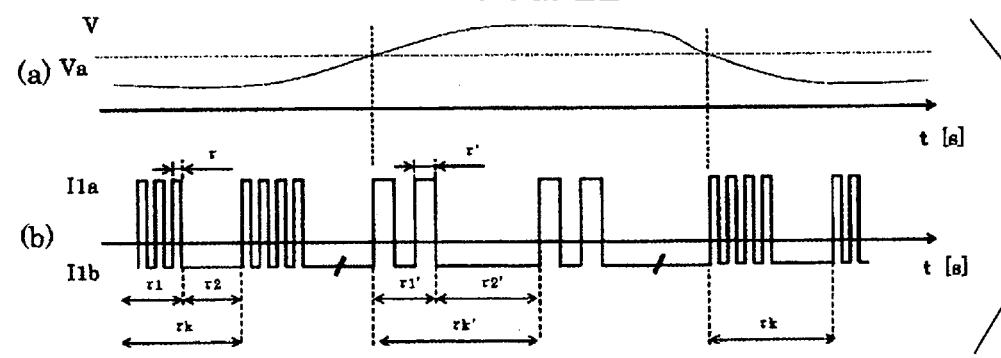
FIG. 23 is a timing chart of a frequency waveform and a current waveform, respectively, that are applied to a lighting apparatus for a high-pressure discharge lamp in accordance with another embodiment of the present invention.

In the case of the operation by selection of two or more waveforms, the procedure of the selection of the waveforms depending on the elapsed time of lighting is described with reference to the relevant drawings. FIGS. 22(a) and 23(a) illustrate waveforms of frequency and FIG. 22(b) and FIG. 23(b) illustrate waveforms of current in accordance with another embodiment of the present invention. These drawings show that two or more waveforms are selected depending on the elapsed time of the lighting mode, regardless of properties of the lamp. The longitudinal axis of FIGS. 22(a) and 23(a), respectively, represent frequencies fb and fa during terms τ and τ' in terms τk and τk', where fb is 1/(τ×2) and fa is 1/(τ'×2). FIGS. 22(a) and 22(b) show periodical repetition of a term Tc1 that is continuance of a waveform having a relatively low frequency fb and a term τk and a term Tc2 that is continuance of a discretely switched waveform having a relatively high frequency fa and a term τk'. FIGS. 23(a) and 23(b) show continuous switching from a waveform having a relatively low frequency fb and a term τk to a waveform having a relatively high frequency fa and a term τk'. The timing chart shown in FIGS. 22(a) and 22(b) illustrate periodical repetition of terms Tc1 and Tc2. Instead, the proportion of the terms Tc1 and Tc2 may be varied or switching from the low-frequency waveform to the high-frequency waveform may be not periodically but gradually performed, in view of the lamp power and the size of the electrode. Similarly, in the timing chart shown in FIG. 23, two or more waveforms may be switched periodically, or from the low-frequency waveform to the high-frequency waveform, from the high-frequency waveform to the low-frequency waveform, or returning to the low-frequency waveform after switching from the low-frequency waveform to the high-frequency waveform.

The length of thermal diffusion at the electrode tip significantly varies by appropriate selection of a plurality of current waveforms, as described above. For example, lighting at a relatively high-frequency waveform leads to a short length of thermal diffusion that causes melting of only the surface layer of the electrode chip and thus formation of a relatively narrow protrusion. In contrast, lighting at a relatively low-frequency waveform leads to a long length of thermal diffusion that causes melting extending to the depth of the electrode tip and thus formation of a relatively thick protrusion. Since the temperature of the electrode tip can be varied depending on the time in such a manner, the size of the protrusion can be controlled to some extent. The control of the size of the protrusion has the following advantages. Long-term lighting in the modulated power lighting mode may cause the shift of the protrusion in some cases. Supply of the electrode recovering power at a proper stage after the lighting in the modulated power lighting mode can suppress the shift of the protrusion, as described above. Such an improvement is further facilitated by the following process.

With reference to FIG. 24, the shape of the electrode tip in the case where lighting is continued using a single waveform in the modulated power lighting mode. FIG. 24(a) illustrates the state of the protrusion in a rated lighting mode, while FIG. 24(b) and (c) illustrates the state in a modulated power lighting mode. In these drawings, reference symbols E1 and E2 represent electrodes, and an auxiliary line P represents the central axis of the electrode. Reference symbols W1 and W2 represents protrusions in the modulated power lighting mode. If the lighting time is prolonged in the modulated power lighting mode, the protrusion W1 formed at the tip of the electrode E1 may be significantly deviated from the position of the protrusion at the rated lighting mode (auxiliary line P) shown in FIGS. 24(b) and 24(c) in some cases. Such a phenomenon is frequently observed in the case of a narrow protrusion formed during lighting using a relatively high-frequency waveform. The inventors confirmed that a relatively narrow protrusion is formed and is readily deviated from the central position of the electrode during lighting by only a high frequency of 740 Hz or more.

Such a shift of the protrusion (W1) at the electrode tip can be effectively suppressed by selection of a waveform having a long thermal diffusion length, i.e., a relatively low frequency to melt the protrusion (W1) to its depth and thus to thicken the protrusion. Sufficient heat, however, cannot be supplied to the thickened protrusion and thus the luminescent spot may shift in some cases. The experimental results by the inventors show that lighting at a low frequency of 480 Hz or less leads to formation of a thickened protrusion that does not readily shift. In order to prevent excess thickening of the protrusion, a waveform having a short thermal diffusion length, i.e., a relatively high frequency to melt only the surface layer of the protrusion and thus to form a narrow protrusion. Accordingly, there is a trade-off relationship between the shift of the luminescent spot caused by the thickening of the protrusion and the deviation of the narrow protrusion from the central position.

After extensive investigation based on these knowledge, the inventors found that the shift of the luminescent spot generated by the thickening of the protrusion and the deviation of the protrusion caused by narrowing of the protrusion can be controlled by lighting using a waveform of a relatively low frequency in the modulated power lighting mode to form a thick immobile protrusion portion at the base and then lighting using a waveform of a relatively high frequency to form a protrusion that is thick at the base and narrow at the tip. In conclusion, periodical recurrence of continuous or discrete repetition of two or more waveforms ensures a periodical change in temperature of the protrusion that contributes to immobilization or stabilization of the protrusion. The present invention has been described by discrete switching of two or more waveforms. Continuous switching also has the same advantages. An example of the embodiment is shown below. These figures are based on the lighting condition shown in FIG. 22.

Rated power of the lamp: 180 W
Waveform: 10.8 ms for $\tau k$, 8.3 ms for $\tau k'$
Term: 5 seconds for Tc1, 15 seconds for Tc2
Frequency: 740 Hz for fa, 480 Hz for fb An embodiment is explained in detail in which the term that performs periodical selection of the waveform by the lighting elapsed time described above is selected by the lamp voltage or lamp current. The control of the shift of the protrusion through periodical switching between the two waveforms with the elapsed time has been explained above. Also has been disclosed is that the selection of the waveform based on the lamp voltage or lamp current is effective for maintenance of the distance between the electrodes. The following embodiment involves periodical switching of the waveforms depending on the elapsed time and a change in the cycle by the lamp voltage in order to improve the stability of the protrusions and the service life of the lamp.

FIG. 25 is a timing chart of another embodiment of the present invention; FIGS. 25(a) and 25(b) represent a frequency waveform and a current waveform, respectively. If the lamp voltage is higher than a target value Va in FIG. 25(a), two waveforms having different frequencies are selected as shown in FIG. 25(b), and these waveforms are periodically repeated during terms Tc1 and Tc2, respectively, as shown in FIG. 25(c). If the lamp voltage is lower than the target value Va, waveforms having selected terms Tc3 and Tc4, respectively, are periodically repeated until the lamp voltage reaches the target value Va. In such a manner, the waveform is periodically switched depending on the elapsed time and the cycle of the switching is varied depending on the lamp voltage, in order to stabilize the protrusion and to prolong the service life of the lamp.

In this embodiment, two or more waveforms are selected during the modulated power lighting mode. In the lighting by supply of the electrode recovering power, other than the light modulation mode, a plurality of waveforms is provided for at least one term of the half-cycle period ($\tau 0$), the first term ($\tau 1$), and the second term ($\tau 2$) and a current selected from these waveforms is supplied during the at least one term based on the state of lighting of the lamp, in order to enhance the advantages.

The detail is explained below. An important point on the recovery and shaping of the electrode is to ensure a wide melting and evaporating region to shape the melt portion around the axis of the electrode, and then to limit the range for deposition of tungsten from the gas phase. The protrusion at the electrode tip can thereby be recovered without deviation from the axis of the electrode. An electrode recovering power is supplied to the electrode such that the melted zone at the electrode tip is shifted to the axis of the electrode, like the secondary protrusion 22a-1 shown in FIG. 18(c), while tungsten is abundantly supplied into the gas phase. Then, a plurality of waveforms to be supplied to at least one term of the half-cycle period ($\tau 0$), the first term ($\tau 1$), and the second term ($\tau 2$) in a predetermined term during and after switching from the electrode recovery mode to the modulated power lighting mode, and a current of a waveform selected from these waveforms is supplied based on the lighting state of the lamp in the at least one term. The deposition range of tungsten abundantly present in the gas phase is thereby limited, and a symmetrical protrusion with respect to the electrode axis can be formed at the electrode tip, like the secondary protrusion 22a-2 shown in FIG. 18(d). High recovery is attained in such a manner.

It is preferred in the present invention that the accumulated power that is input to the electrode (a) at the anode phase having a high disproportionate ratio (I1a/I1b) is controlled to be higher than the accumulated power that is input to the electrode (b) at the anode phase during a term that supplies the electrode recovering power. The details are described with reference to FIGS. 15 and 18.

As a result of detailed observation of the electrode tip in conjunction with the lighting waveform, the deformation of the protrusion primarily occurs at the electrode 20a receiving a current I1a having a highly disproportionate current. Accordingly, it is preferred to recover the electrode 20a predominantly in view of the efficiency and effect of the electrode recovery. In other words, preferably, the electrode 20a is primarily recovered during the supply of the electrode recovering power. If the current or power is gradually increased to the electrode recovering power while the ratio of the first term ($\tau 1$) to the second term ($\tau 2$) is maintained at a predetermined value during the electrode recovering power supply, the electrode receives a waveform shown in FIG. 15(e). In such a case, the load of the electrode 20b rather than the electrode 20a significantly increases. That is, as the power increases, the disproportionate ratio (I1a/I1b) of the waveform in the first term ($\tau 1$) decreases, but the relation, first term ($\tau 1$)<second term ($\tau 2$), is maintained. As a result, the accumulated power during the first term ($\tau 1$) is lower than that during the second term ($\tau 2$). In this case, it is preferred that the electrode 20b having a low current disproportionate ratio, rather than the electrode 20 having a high current disproportionate ratio, is predominantly recovered.

The primary object of supply of the electrode recovering power is to maintain the quality of the electrode of the discharge lamp. This is a lighting mode for maintenance of the lamp, and does not necessarily satisfy the user needs. Accordingly, the lighting term at the electrode recovering power is preferably minimized. Since the electrode unintentionally melts and evaporates to a certain extent during the recovery of the electrode, it is preferred that the term and frequency of the electrode recovering power supply be kept to the minimum to prevent the lamp from blackening and having a short life span.

From a comprehensive view point of these facts, the electrode recovering power can be supplied more efficiently and effectively, as described below: On the supply of the electrode recovering power, the accumulated power that is input to the electrode (20a) at the anode phase having a high disproportionate ratio (I1a/I1b) is controlled to be higher than the accumulated power that is input to the electrode (20b) at the anode phase so that the supply power (current) is determined to predominantly recover the electrode (20a). The detail of the embodiment is described with reference to FIGS. 18 and 26.

Figure 26:
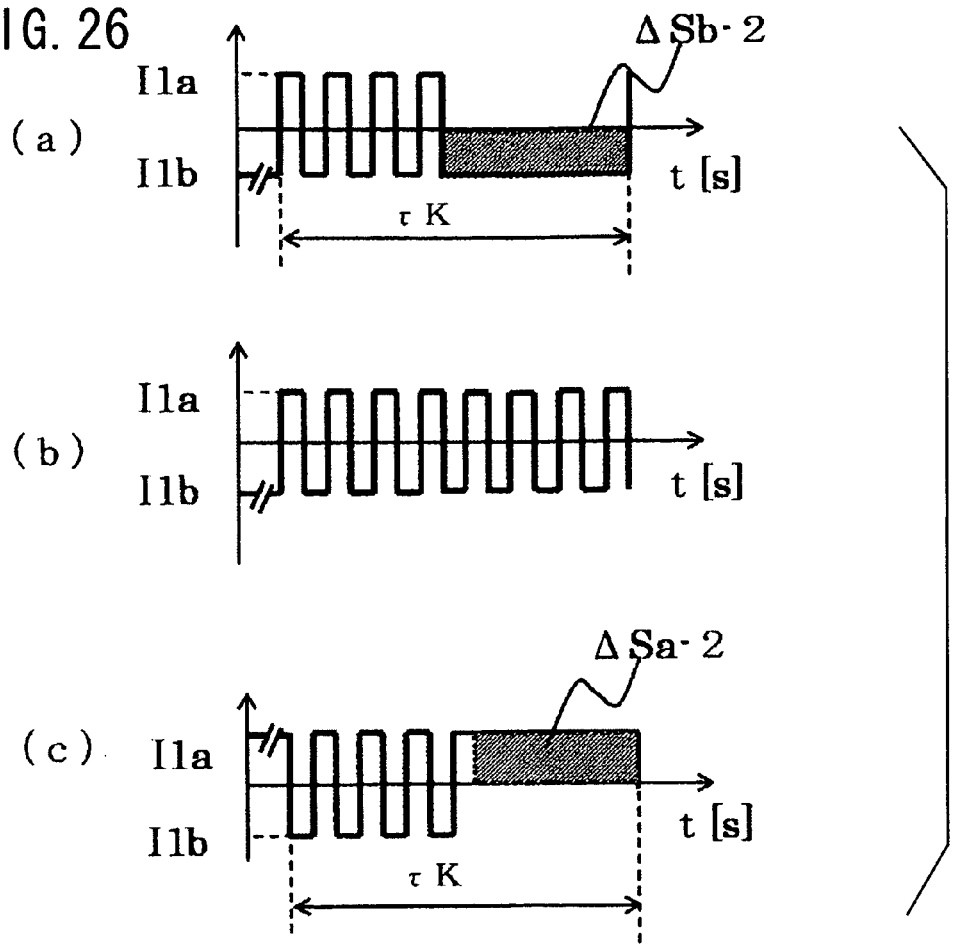
FIG. 26 illustrates a lighting waveform supplied to a lighting apparatus for a high-pressure discharge lamp in accordance with an embodiment of the present invention.

FIG. 26 illustrates a current waveform during supply of the electrode recovering power of this embodiment, where the longitudinal axis represents current waveform, the longitudinal axis represents time, I1a is a current flowing in a first electrode (20a), and I1b is a current flowing in a second electrode (20b). The waveforms during the supply of the electrode recovering power can be roughly categorized into those shown in FIGS. 26(a) to 26(c). The power accumulated at the anode phase in the electrode 20b is ΔSb-2 larger than that in the electrode 20a by ΔSb-2 in the case of the waveform shown in FIG. 26(a), is equal to in FIG. 26(b), or ΔSa-2 less than FIG. 26(c). It is preferred that the integrated value of the summation ΔSa-2[A·ms] of the power disproportionately input to the first electrode (20a) in the first term (τ1) and the integrated value of the summation ΔSb-2 of the power disproportionately input to the second electrode (20b) in the second term (τ2) during the supply of the electrode recovering power satisfy the following relation:

$$[\int \Delta Sa\text{-}2 \cdot dt / \int \Delta Sb\text{-}2 \cdot dt \leq 1 \tag{8}$$

In the case of this relation, a significantly deformed protrusion of the tip of the electrode 20a can be recovered efficiently and effectively. Since the lamp voltage is almost constant, the accumulated value of current may be used in place of the accumulated power.

This embodiment is now described. In the case where the lighting waveform during the electrode recovering power is gradually changed as shown in FIGS. 16(a) to 16(i), a predetermined waveform, for example, as sown in FIG. 16(i) may be maintained for several seconds, as described above (paragraph [0089]). Alternatively, waveforms as shown in FIGS. 16(a) to 16(d) (or to FIG. 26(a)) are each applied for a short time and slowly and continuously changed to waveforms as shown in FIGS. 16(f) to 16(i) (or to FIG. 26(c)). In other words, in order to satisfy relation (8), the waveform shown in FIG. 26(c) is applied for a longer time compared to the time for application of the waveform shown in FIG. 26(a) during the term for supply of the electrode recovery power.

Figure 27:
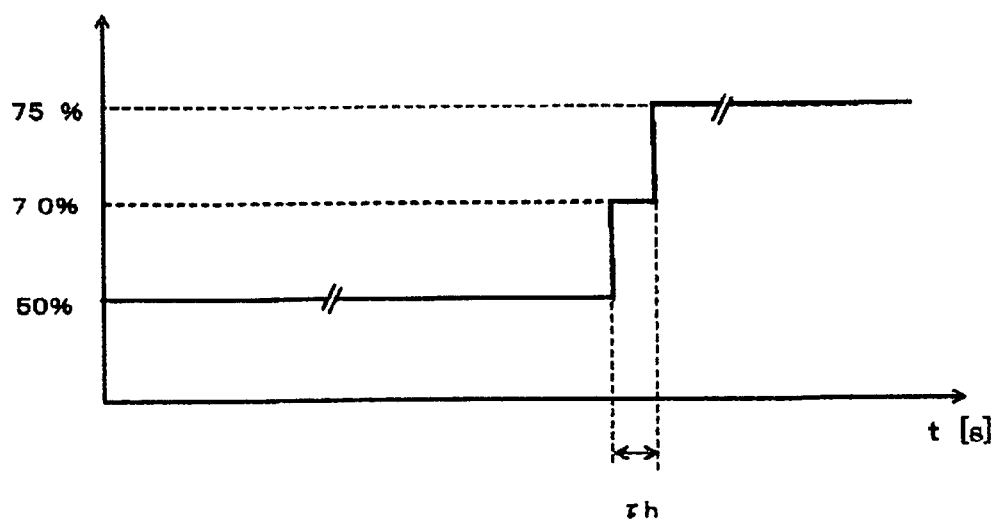
FIG. 27 illustrates a waveform and its timing chart when a modulated power lighting mode changes to a stationary power lighting mode in a lighting apparatus for a high-pressure discharge lamp in accordance with an embodiment of the present invention.

On the change from the stationary power lighting mode to the modulated power lighting mode, the embodiment described above is intercalation of a power that is lower than the power in the stationary power lighting mode and higher than the power in the modulated power lighting mode. A reverse way, that is, changing from the modulated power lighting mode to another mode is described with reference to FIG. 27. FIG. 27 is a simplified timing chart on the power in the case of change from the modulated power lighting mode to the stationary power lighting mode. On the premise of use of the modulated power mode of the present invention in a projector, a predetermined modulated power lighting mode must be successfully changed to another lighting mode (for example, stationary power lighting mode).

Continuous lighting of the discharge lamp by a modulated power lighting mode may cause irregular deformation of the protrusion at the electrode tip of the discharge lamp, as described above. In such a state, the shape of the electrode can be recovered by driving the electrode with an electrode recovering power that is higher than the power in the modulated power lighting mode. Alternatively, a lighting mode having a power that is equal to or higher than the electrode recovering power, for example, a stationary power lighting mode having a significantly high power can be directly used as an electrode recovering power mode. On the contrary, before a change to a lighting mode having a power lower than the electrode recovering power (for example, a power lower than the electrode recovering power, another modulated lighting mode having a different power, or a low-power stationary power lighting mode), it is preferred that a power that can recover the shape of the electrode is applied for a predetermined term (th).

FIG. 27 illustrates an embodiment involving a change from a modulated lighting power that is about 50% of the rated power to a low stationary power lighting mode that is about 75% of the rated power via supply of an electrode recovery power for a predetermined term (th). During the supply of the electrode recovering power, a specific waveform suitable for recovery of the electrode is selected by fixing the polarity of the low frequency in one way for a predetermined term. Although the electrode recovering power is 70%, which is lower than 75%, a waveform having high electrode recovery effects is selected. The lighting mode, which has electrode recovering effects and is intercalated before the other mode, may have any electrode recovering power other than 70%. In that sense, the power having the recovery effects must be higher than the modulated light mode. FIG. 27 illustrates a stepwise change between adjacent modes. Alternatively, such a change for electrode recovery may be a gradual or continuous change.

If the mode is changed to a mode having a power lower than that of the electrode recovering power or a stationary power lighting mode having a nondisproportionate current and a slightly lower power (for example, 75%) under a state of the deformed electrode, the arc luminescent spot of the discharge lamp is not stabilized, resulting in the shift of the luminescent spot or occurrence of flickering. Such a problem of unstable shape is prevented by a change in power from a lighting mode having a substantially identical or more recovery effect than that during the electrode recovering power for a predetermined time to the other power.

Instead of the electrode recovering power, a waveform that can recovery the shape of the electrode may be selected for a predetermined term after the change to the other mode (having a power higher than that of the modulated power lighting mode). For example, after an immediate change to the other lighting mode, an asymmetric waveform that is typical in the electrode recovering power supply may be selected until the electrode is recovered, and then followed by selection of a general symmetric waveform for driving the discharge lamp. Accordingly, any electrode recovering power higher than that of the modulated power lighting mode can be used. The recovering power may be equal to the power of the other lighting mode after the change in some cases.

A control system for power modulation or switching of the current waveform is further explained with reference to the configuration of the projector shown in FIG. 7. The projector control unit 31 of the projector sends a command for setting electric power to the power supply unit 30, for example, by UART communication. Such a command for setting electric power has, for example, 64 or 128 gradation sequences for 0 to 100% power. Based on the command, the power supply unit 30 generates a power. In this embodiment, the projector control unit 31 controls the power supply unit 30 to generate a power and its current waveform supplied to the high-pressure discharge lamp 10. Alternatively, the power supply unit 30 has such a power modulation or current waveform switching function or its sequencing function. A required minimum circuit configuration for illustration of the operation and function of the lighting apparatus for a high-pressure discharge lamp of the present invention is disclosed in the specification. Thus, various details on the circuit configuration and its operation, such as polarity of a signal, selection, addition, or deletion of actual circuit elements, and creative efforts such as modifications due to availability of devices and economical reasons should be determined on designing of an actual apparatus. The configuration of the lighting apparatus for a high-pressure discharge lamp of the present invention should not be limited to the circuit system described in the specification.

The preceding description has been presented only to illustrate and describe exemplary embodiments of the present lighting apparatus for high-pressure discharge lamp and projector. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope.

What is claimed is:

1. A lighting apparatus for a high-pressure discharge lamp, comprising:
   an electric discharge container that comprises of quartz glass and contains a pair of counter electrodes; and
   a power supply unit that supplies an AC current to the high-pressure discharge lamp,
   wherein the power supply unit has a normal power lighting mode and a modulated power lighting mode that supplies current having a power less than a power in the normal power lighting mode,
   wherein the modulated power lighting mode supplies a rectangular AC current having a first term and a second term,
   wherein a mean high-frequency current value supplied to a first electrode at an anode phase is greater than a mean current value supplied to a second electrode at the anode phase in the first term, and
   wherein a current is supplied to the second electrode at the anode phase for a term longer than the half-cycle period in the second term, the current being lower than the mean high-frequency current value supplied to the first electrode.

2. The lighting apparatus for a high-pressure discharge lamp of claim 1, wherein the high-frequency current in the first term is at least two cycles.

3. The lighting apparatus for a high-pressure discharge lamp of claim 1, wherein the mean current value supplied to the first electrode is 100% to 450% of the mean current value supplied to the second electrode, in the first term.

4. The lighting apparatus for a high-pressure discharge lamp of claim 1, wherein the frequency of the high-frequency current in the first term is at least 80 Hz.

5. The lighting apparatus for a high-pressure discharge lamp of claim 1, wherein the polarity is not switched in the second term.

6. The lighting apparatus for a high-pressure discharge lamp of claim 1, wherein the term that supplies the current to the second electrode in the second term is an integral multiple of the half-cycle period of the high-frequency current to the first electrode in the first term.

7. The lighting apparatus for a high-pressure discharge lamp of claim 1, wherein the sum of the first term and the second is 25 ms or less.

8. The lighting apparatus for a high-pressure discharge lamp of claim 1, wherein the ratio of the first term to the second term ranges from 0.2 to 10.5.

9. The lighting apparatus for a high-pressure discharge lamp of claim 1, wherein the summation $\Delta Sa$ of power disproportionately applied to the first electrode in the first term and the summation $\Delta Sb$ of power disproportionately applied to the second electrode in the second term satisfy the relation:

$$0.27 \leq \Delta Sa/\Delta Sb \leq 10.5.$$

10. The lighting apparatus for a high-pressure discharge lamp of claim 1, wherein the power supply unit comprises a switching means capable of switching the polarity of the high-frequency electric current supplied during the first term and the current supplied during the second term.

11. The lighting apparatus for a high-pressure discharge lamp of claim 1, wherein the disproportionate ratio of waveforms during the first term is changed by the voltage, current, or power of the lamp.

12. The lighting apparatus for a high-pressure discharge lamp of claim 1, wherein the power supply unit has a plurality of waveforms for at least one term of the half-cycle period, the first term, and the second term in the modulated power lighting mode, and supplies an electric current selected from the plurality of waveforms based on the lighting state of the lamp during the at least one term.

13. The lighting apparatus for a high-pressure discharge lamp of claim 1, wherein the power supply unit switches to an electrode recovering power that is higher than the power in the modulated power lighting mode during a certain period at predetermined elapsed time intervals.

14. The lighting apparatus for a high-pressure discharge lamp of claim 13, wherein the power supply unit supplies the electrode recovering power that is lower than the power in the normal power lighting mode.

15. The lighting apparatus for a high-pressure discharge lamp of claim 13, wherein in the term supplying the electrode recovering power, the power supply unit gradually increases the power from the power of the modulated power lighting mode to the electrode recovering power, reduces the current disproportionate ratio of the waveform in the first term, maintains the electrode recovering power during a predetermined period, and gradually decreases the power from the second power to the power of the modulated power lighting mode while gradually increasing the current disproportionate ratio of the waveform in the first term.

16. The lighting apparatus for a high-pressure discharge lamp of claim 13, wherein the power supply unit gradually changes the half cycle period of the second term in the term supplying the electrode recovering power.

17. The lighting apparatus for a high-pressure discharge lamp of claim 13, wherein the power supply unit inverts the polarity of one electrode of the first and second electrodes to which the power is supplied during the second term in the modulated power lighting mode, after the supply of the electrode recovering power.

18. The lighting apparatus for a high-pressure discharge lamp of claim 13, wherein the power supply unit has a plurality of waveforms for at least one term of the half-cycle period, the first term, and the second term in the modulated power lighting mode, or the term supplying the electrode recovering power, or the modulated power lighting mode and the term supplying the electrode recovering power, and supplies an electric current having one waveform selected from the plurality of waveforms based on the lighting state of the lamp during the at least one term.

19. The lighting apparatus for a high-pressure discharge lamp of claim 13, wherein the power supply unit controls terms such that any one term of the half-cycle period, the first term, and the second term in the modulated power lighting mode is shorter than the corresponding term in the electrode recovering power supply mode, in the case where the modulated power lighting mode is switched after the supply of the electrode recovering power or during a predetermined term after switching to the modulated power lighting mode.

20. The lighting apparatus for a high-pressure discharge lamp of claim 13, wherein the power supply unit controls powers such that the accumulated power input to one electrode of the first and second electrodes having a higher disproportionate ratio during the anode phase is greater than the accumulated power input to the other electrode during the anode phase, in the electrode recovering power supply term.

21. A projector comprising:
the lighting apparatus for a high-pressure discharge lamp according to claim 1;
a control unit comprising an image controller that processes image signals and a lighting controller that controls lighting of the high-pressure discharge lamp;
a light modulation device; and
a magnifying device.

* * * * *